(12) United States Patent
Veatch, III et al.

(10) Patent No.: US 11,000,155 B2
(45) Date of Patent: May 11, 2021

(54) PORTABLE GRILL HAVING LOW-TEMPERATURE EXTERIOR CASING

(71) Applicant: Nomad Grills, LLC, Dallas, TX (US)

(72) Inventors: John Joseph Veatch, III, Dallas, TX (US); Cameron Mills Leggett, Dallas, TX (US)

(73) Assignee: Nomad Grills, LLC, Dallas, TX (US)

( * ) Notice: Subject to any disclaimer, the term of this patent is extended or adjusted under 35 U.S.C. 154(b) by 287 days.

(21) Appl. No.: 16/265,639

(22) Filed: Feb. 1, 2019

(65) Prior Publication Data

US 2019/0239687 A1 Aug. 8, 2019

Related U.S. Application Data

(60) Provisional application No. 62/625,798, filed on Feb. 2, 2018.

(51) Int. Cl.
*A47J 37/06* (2006.01)
*A47J 37/07* (2006.01)

(52) U.S. Cl.
CPC ....... *A47J 37/0763* (2013.01); *A47J 37/0704* (2013.01)

(58) Field of Classification Search
CPC .... A47J 37/0623; A47J 37/0664; A47J 37/07; A47J 37/0704; A47J 37/0718; A47J 37/0727; A47J 37/0731; A47J 37/0754; A47J 37/0763; A47J 37/0786
USPC ......... 99/340, 343, 418, 426, 445, 446, 449, 99/450, 482; 126/25 R, 26, 27, 29, 30, 126/211, 218
See application file for complete search history.

(56) References Cited

U.S. PATENT DOCUMENTS

| D193,589 | S | 9/1962 | Friday |
| 3,478,194 | A * | 11/1969 | Lescure ............... A47J 37/0611 |
| | | | 219/402 |
| D251,893 | S | 5/1979 | Chan |

(Continued)

OTHER PUBLICATIONS

Go-Anywhere Charcoal Grill, Weber Grills, n.d. [online], [retrieved on Jan. 31, 2019]. Retrieved from the Internet <https://www.weber.com/US/en/grills/portable-grills/go-anywhere-series/121020.html>.

(Continued)

*Primary Examiner* — Hung D Nguyen
(74) *Attorney, Agent, or Firm* — Craige Thompson; Thompson Patent Law

(57) ABSTRACT

Apparatus and associated methods relate to a highly portable grill having an outer casing enclosing an inner cook box that acts as a heatsink to dissipate thermal energy, the outer casing being mechanically attached to the inner cook box at attachment points that function as thermal chokepoints for controlled conduction of thermal energy. In an illustrative example, the inner cook box may be mechanically attached to the outer casing via complementary screws and bosses to provide a limited thermal conduction pathway. The inner cook box may include a plurality of fins for added thermal energy dissipation. The outer casing may include a plurality of convection apertures to facilitate convective flow of thermal energy from the inner cook box to an external ambient environment. A limited thermal conduction pathway may beneficially allow the outer casing to be safe-to-touch while the inner cook box is still in use.

20 Claims, 28 Drawing Sheets

(56) References Cited

U.S. PATENT DOCUMENTS

| | | | |
|---|---|---|---|
| 4,392,477 A * | 7/1983 | Milligan | F24B 1/181 |
| | | | 126/163 R |
| D358,204 S | 5/1995 | Ferrier | |
| D461,051 S | 8/2002 | Cheng | |
| 6,644,298 B2 * | 11/2003 | Hermansen | A47J 37/0704 |
| | | | 126/144 |
| D576,444 S | 9/2008 | Chung | |
| D577,534 S | 9/2008 | Chung | |
| 7,438,071 B2 | 10/2008 | Johnson et al. | |
| 7,802,565 B2 | 9/2010 | Bruno | |
| D771,994 S | 11/2016 | Zemel et al. | |
| D773,817 S | 12/2016 | Hower | |
| D784,064 S | 4/2017 | Hebert, Jr. et al. | |
| D806,463 S | 1/2018 | Gloger | |
| D819,331 S | 6/2018 | Ballou et al. | |
| D819,387 S | 6/2018 | Stein | |
| D843,156 S | 3/2019 | Hebert, Jr. et al. | |
| D850,200 S | 6/2019 | Jiang | |
| D874,143 S | 2/2020 | Seibert | |
| D902,587 S | 11/2020 | Zhu | |
| 2002/0020144 A1 * | 2/2002 | Sarles | B29C 66/53421 |
| | | | 219/633 |
| 2008/0060633 A1 | 3/2008 | Antwine | |
| 2016/0174298 A1 * | 6/2016 | Moon | H05B 6/062 |
| | | | 219/622 |

OTHER PUBLICATIONS

Mon Oncle bbq, RS Barcelona, n.d [online], [retrieved on Jan. 31, 2019]. Retrieved from the Internet <http://rs-barcelona.com/en/mon-oncle-bbq>.

* cited by examiner

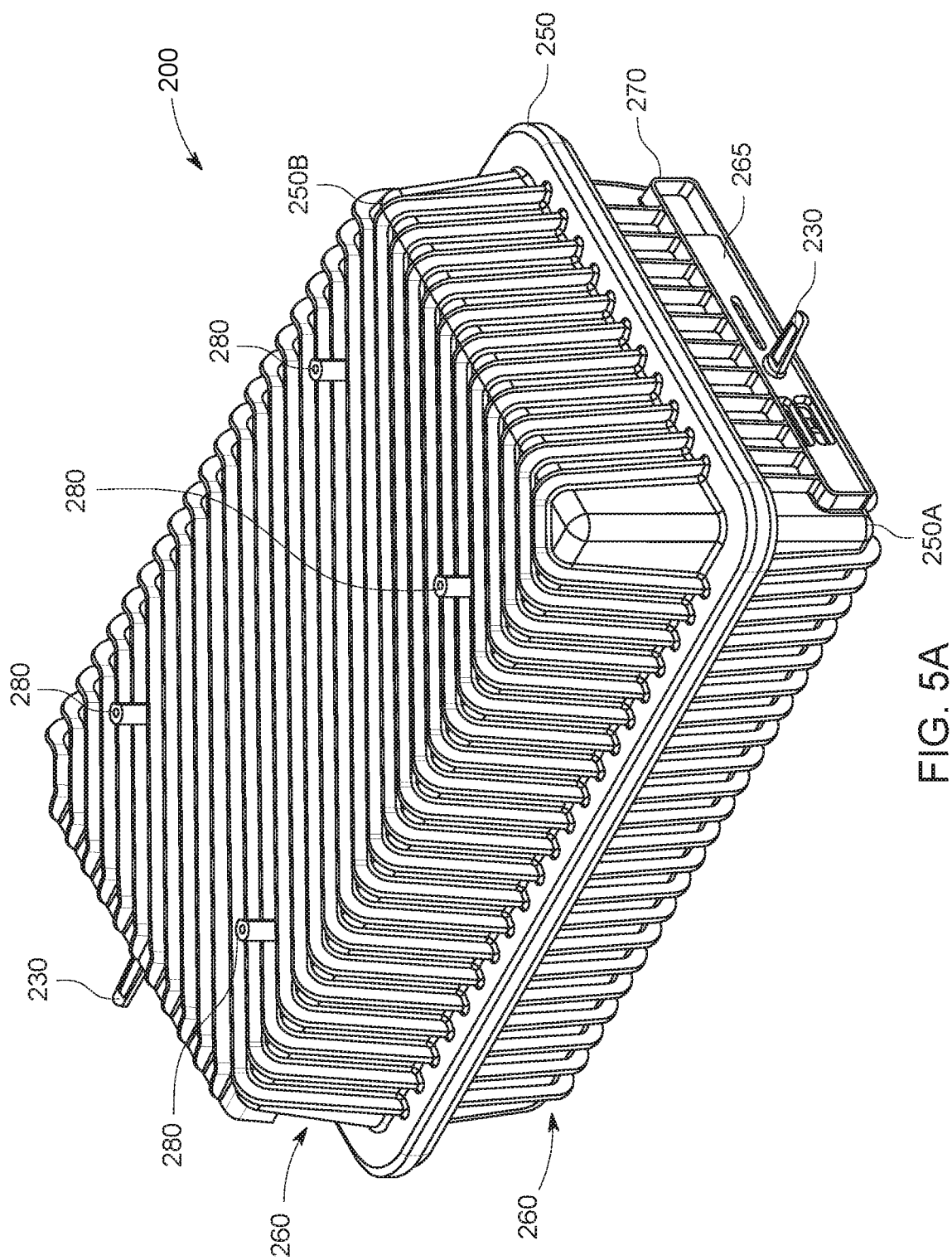

US 11,000,155 B2

PORTABLE GRILL HAVING LOW-TEMPERATURE EXTERIOR CASING

CROSS-REFERENCE TO RELATED APPLICATIONS

This application claims the benefit of U.S. Provisional Application Ser. No. 62/625,798, titled "Portable Grill," filed by John Joseph Veatch III and Cameron Mills Leggett on Feb. 2, 2018.

This application incorporates the entire contents of the foregoing application(s) herein by reference.

TECHNICAL FIELD

Various embodiments relate generally to a compact and portable grill and smoker device with heatsinks for thermal management, temperature regulation, and heat dissipation to moderate exterior heat.

BACKGROUND

A barbecue grill is a device that cooks food. There are several varieties of grills. Charcoal grills use either charcoal briquettes or natural lump charcoal as their fuel source. When burned, the charcoal will transform into embers radiating the heat necessary to cook food. Gas-fueled grills typically use propane or butane liquified petroleum gas, or natural gas as their fuel source, with gas-flame either cooking food directly or heating grilling elements which in turn radiate the heat necessary to cook food.

SUMMARY

Apparatus and associated methods relate to a highly portable grill having an outer casing enclosing an inner cook box that acts as a heatsink to dissipate thermal energy, the outer casing being mechanically attached to the inner cook box at attachment points that function as thermal chokepoints for controlled conduction of thermal energy. In an illustrative example, the inner cook box may be mechanically attached to the outer casing via complementary screws and bosses to provide a limited thermal conduction pathway. The inner cook box may include a plurality of fins for added thermal energy dissipation. The outer casing may include a plurality of convection apertures to facilitate convective flow of thermal energy from the inner cook box to an external ambient environment. A limited thermal conduction pathway may beneficially allow the outer casing to be safe-to-touch while the inner cook box is still in use.

Various embodiments may achieve one or more advantages. For example, some embodiments may relate to foldable barbecue grills with wide-ranging usefulness designed to be used by people with a need for portability. Various embodiments may solve a problem of grills getting too hot to touch or handle while in use, by substantially minimizing conditions that produce a contact burn or injury. Various embodiments may solve this problem by dissipating heat more quickly than heat can build up at an outer-most system surface, thus allowing the outer-most system surface to be safe-to-the-touch. An exemplary grill may be portable while in use, and also allow users to quickly "close-and-go" when the user is finished grilling and/or using the device. In other words, there may be no need for a user to wait around for the grill to cool down. Rather, the user may quickly shut the device, and move or store the device, as the outer-most system surface is designed and engineered for personal protection.

Various embodiments may advantageously be portable and may be designed to be used by people on-the-go or with a need for portability (e.g., tailgating, camping, outdoor cookouts, picnics, beach parties, backyard parties, small patios, big patios, apartment balconies, grilling in the park, hunting, fishing, sailing, on the dock, on the lake, festivals). Some examples of a portable grill may advantageously provide wide-ranging usefulness and versatility of use (e.g., an all-in-one aspect: BBQ, grill, smoke, roast, bake, and sear). Various structures and aspects of an exemplary grill may yield optimized thermal management properties to advantageously maintain a charcoal-fueled fire for cooking high-performance flame output while an exterior surface of the grill remains safe-to-the-touch for personal protection, as well as the ability to quickly pack up the grill and transport it to a new location. Various implementations of a grill may provide high portability, as the grill may be lightweight (e.g., approximately 25 pounds), foldable, and compact (e.g., 20" W×13" L×9" H).

The details of various embodiments are set forth in the accompanying drawings and the description below. Other features and advantages will be apparent from the description and drawings, and from the claims.

BRIEF DESCRIPTION OF THE DRAWINGS

FIGS. 5A-5G depicts various views of an exemplary portable grill with an exterior casing removed to show the outer surface of a cook box/heatsink.

Like reference symbols in the various drawings indicate like elements.

DETAILED DESCRIPTION OF ILLUSTRATIVE EMBODIMENTS

Figure 1A:
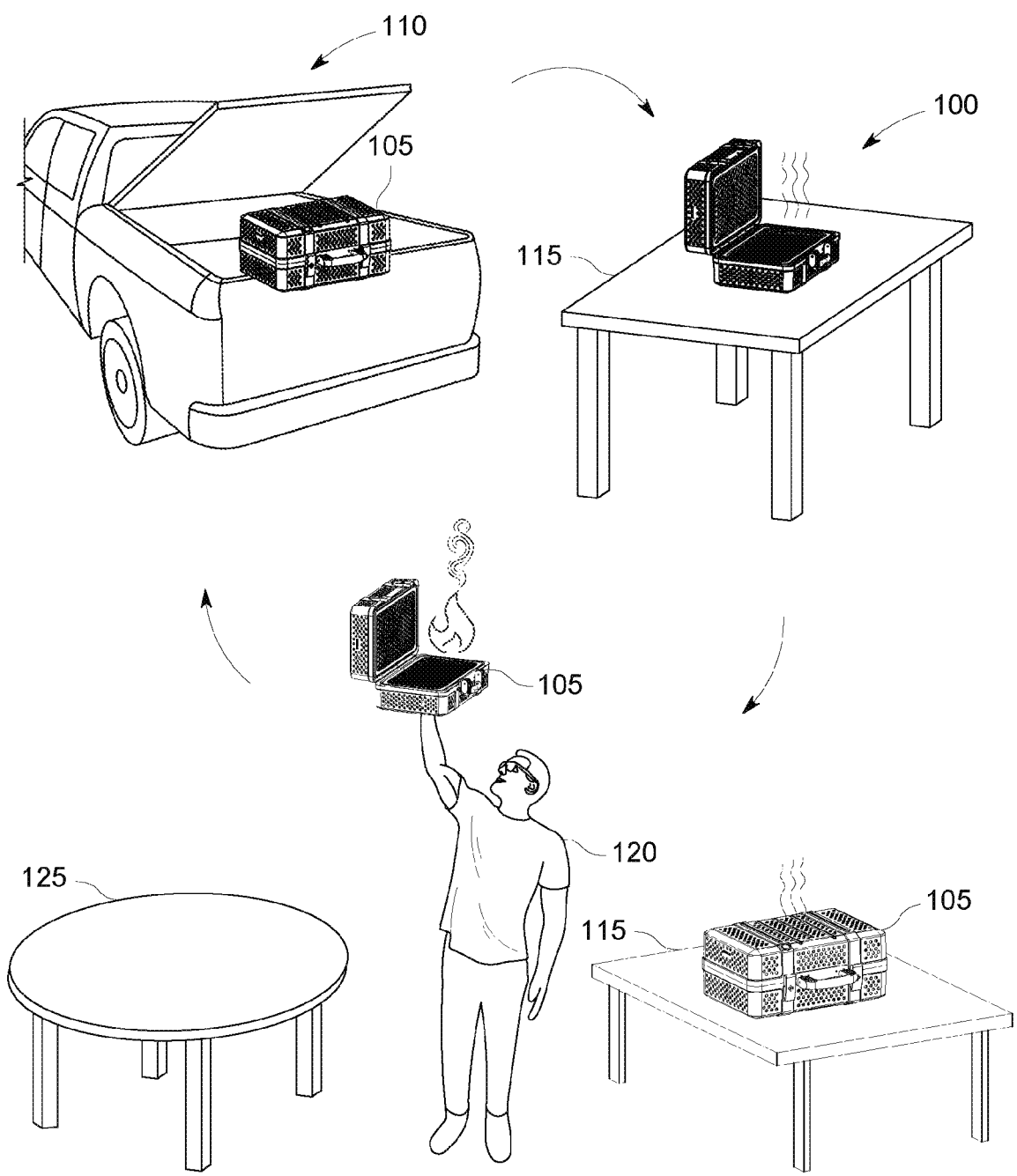
FIG. 1A depicts a perspective view of an exemplary portable grill handling scenario illustrating a person safely carrying the grill while it is in use.

FIG. 1A depicts a perspective view of an exemplary portable grill handling scenario illustrating a person safely carrying the grill while it is in use. A grill deployment scenario 100 may take place in an outdoor setting where grilling is to take place, such as at a campsite, a beach, or a tailgate, for example. The grill deployment scenario 100 includes an exemplary grill 105 being taken out of the trunk of a vehicle 110. Next, the grill 105 is placed on a first table 115, where the grill 105 may be "fired up" to begin cooking food. Next, a person 120 may desire to transport the grill 105 to a new location, such as a second table 125. Because the grill 105 is still in use, at least some (internal) components of the grill 105 may be too hot to touch. However, because the grill 105 employs a unique thermal isolation mechanism to limit thermal conduction between an outer casing of the grill 105 and an inner cook box/heatsink of the grill 105 (depicted diagrammatically in FIG. 1B), the outer surfaces of the grill 105 may be cool enough for the person 120 to touch, handle, and/or carry without the risk of being burned. Accordingly, the person 120 may safely transport the grill 105 to a new location while the grill 105 is still in use (or soon after use), due, for example, to the fact that the outer surfaces of the grill are thermally isolated from the (potentially very hot) inner components of the grill. For example, the person 120 may retrieve the grill 105 while it is still in use, and place it back into the trunk of the vehicle 110.

In another exemplary scenario, special circumstances (such as a medical emergency or an incoming thunderstorm, for example) may necessitate immediate pack up of the grill 105 by the person 120. The person 120 may quickly respond to the special circumstances by shutting the grill 105 while it is in use, and carrying it back to the vehicle 110 without being burned, since the outer surface of the grill 105 has been uniquely designed to be thermally isolated from the (potentially very hot) inner components of the grill 105. Advantageously, this unique thermal isolation design of the grill 105 may allow for the outer surface of the grill 105 to be safe-to-the-touch and portable (while in use), which may allow the person 120 to quickly "close-and-go" when the person 120 is finished using the grill 105.

Figure 1B:
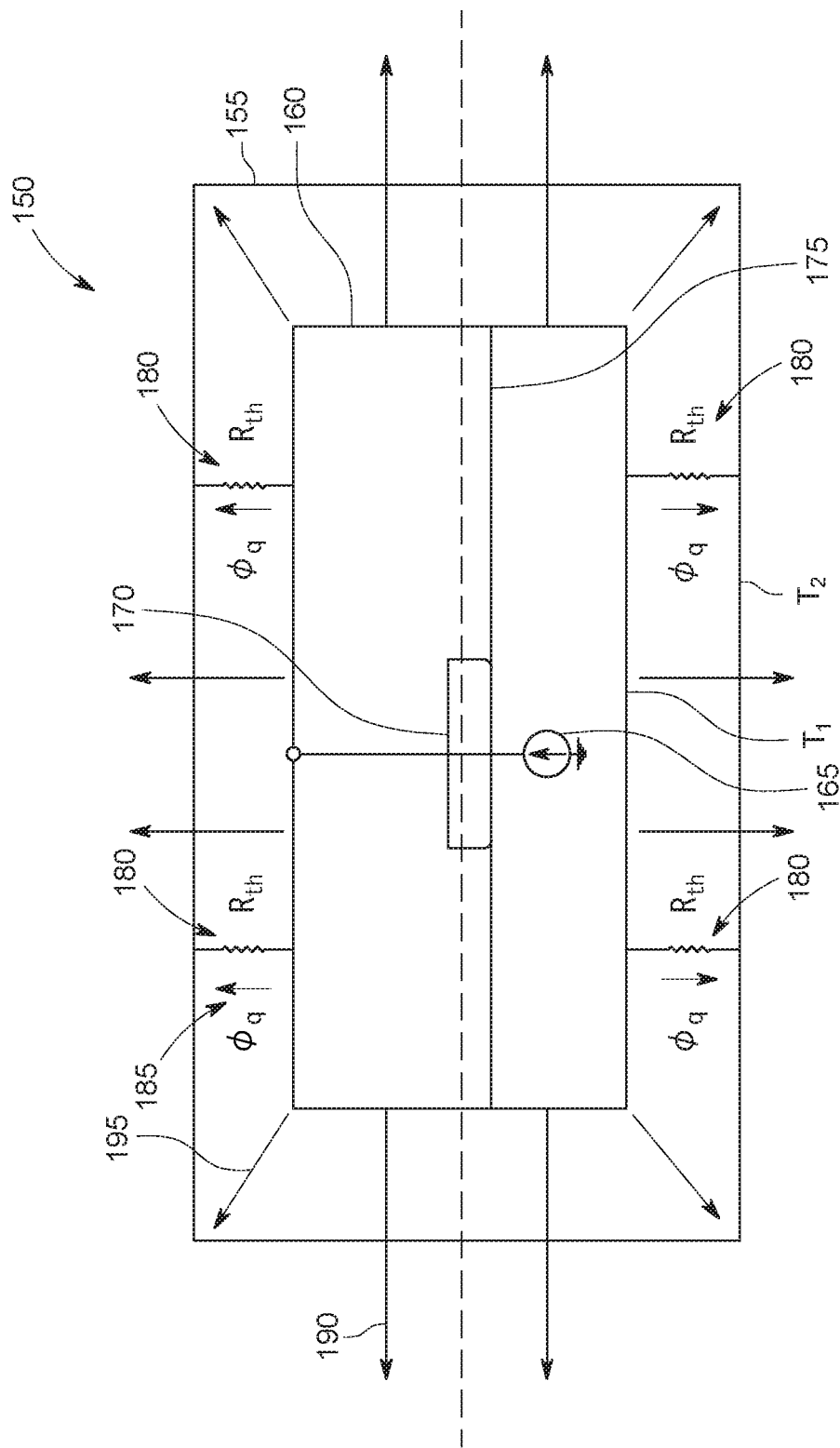
FIG. 1B depicts a schematic view of an exemplary portable grill illustrating mechanical and thermal attachment points and unique thermal energy dissipation mechanisms.

FIG. 1B depicts a schematic view of an exemplary portable grill illustrating mechanical and thermal attachment points and unique thermal energy dissipation mechanisms. An exemplary grill 150, shown in a closed state, includes an outer casing 155. The outer casing 155 may include a top (lid) section that is hingedly coupled to a bottom (base) section. Located within the outer casing 155 is an inner cook box 160. The cook box 160 may be formed of a material with high thermal conductivity properties (e.g., greater than 100 W/(m·K). For example, the inner box may be formed of aluminum. Within the cook box 160 is a heat source 165, which may be at a temperature of about 300°, 400°, or about 500° F. or more. The heat source 165 may be a substance such as burning charcoal or wood (or other combustible fuel), that lies on a bottom surface of the cook box 160. The heat source 165 is shown as heating up/cooking a food item 170, which may be a piece of meat, such as a chicken breast or a rib-eye steak, for example. The food item 170 is sitting atop a grilling grate 175 supported within the cook box 160. Because the heat source 165 is located within the cook box 160, and the cook box 160 is made of a thermally conductive material, the high temperature heat source 165 may transfer a significant amount of thermal energy to the cook box 160, such that the cook box 160 may reach an average high temperature of $T_1$. The temperature $T_1$ may be similar to the temperature of the heat source 165 (e.g., about 300°, 400°, or about 500° F. or more), which may mean that the surfaces of the cook box 160 are not safe for physical human touch. However, the outer casing 155 may advantageously be at a temperature $T_2$ that is significantly less than $T_1$ (e.g., safe to touch), due to a limited thermal conduction coupling between the outer casing 155 and the inner cook box 160.

This limited thermal conduction coupling between the outer casing 155 and the inner cook box 160 is achieved by employing a limited number of mechanical and thermal attachment members 180. In some examples, the attachment members 180 may, in some examples, include fasteners that fixedly couple top and bottom sections of the cook box 160 to top and bottom sections of the casing 155, respectively. The attachment members 180 mechanically support the cook box 160 in the casing 155, while also functioning as a limited thermal pathway (or "thermal chokepoint") for a limited amount of thermal energy to conductively transfer from the cook box 160 to the casing 155. In some embodiments, each attachment member 180 may have a thermal resistance $R_{th}$ governed by the following equation:

$$R_{th} = \frac{x}{A*k}$$

Where $R_{th}$ is the absolute thermal resistance (across the radial length of the member 180), x is the length of the material (measured on a path parallel to the heat flow, e.g., the path from the cook box to the outer casing), k is the thermal conductivity of the material, and A is the cross-sectional area (perpendicular to the path of heat flow). The above equation may be written in terms of the extensive properties of the material(s) of the attachment member 180. In the depicted example, the flow of heat is from the cook box 160 (at temperature $T_1$) to the casing 155 (at temperature $T_2$ less than $T_1$). In various examples, the only thermal conductive path between the cook box 160 and the casing 155 is through the attachment members 180. By limiting the amount of thermal energy that can conductively pass from the cook box 160 to the casing 155 (via the attachment members 180), the casing 155 may be at a relatively cool temperature (which may be low enough for a human to touch without suffering burns), while the cook box 160 (and its inner contents) is at a relatively high temperature (e.g., about 300°, 400°, or about 500° F. or more). Given the thermal resistance $R_{th}$ of each attachment member 180, the amount of heat transferred through each attachment member 180 may be calculated (by way of example and not limitation) using the following equation:

$$R_{th} = \frac{\Delta T}{\dot{Q}}$$

Where $\Delta T = T_1 - T_2$ and $\dot{Q}$ is the amount of heat energy transferred per unit time from the cook box 160 to the outer casing 155 via a single attachment member 180.

The above equation is analogous to Ohm's law for electrical circuits (R=V/I). Therefore, the above equation indicates how the heat transfer from the cook box 160 to the outer casing 155 may be significantly limited/controlled by the resistance $R_{th}$ of each attachment member 180.

The cook box 160 acts as a heatsink for the portable grill 150, such that the cook box 160 may dissipate heat through three different types of heat energy transfer mechanisms—conduction, convection, and radiation. For example, the cook box 160 may act as a heatsink for burning fuel 165 contained within the portable grill 150. Heat generated by burning fuel 165 may transfer to the cook box 160, which may then distribute (via thermal conduction) the heat throughout the material of the cook box 160. At least some thermal energy of the cook box 160 may then be transferred to the casing 155 via the attachment members 180. This transfer of energy is represented in FIG. 1B as a conductive heat flux 185 ($\varphi_q$) that is directed from the cook box 160 to the casing 155 via the attachment members 180. Each attachment member 180 may have a thermal resistance $R_{th}$ with a value that is great enough to significantly restrict the amount of thermal energy conducted from the cook box 160 to the casing 155, which may beneficially limit the temperature of the casing 155 to a level that is safe for human touch. For example, the value of $R_{th}$ may be designed such that the approximate working surface temperature of the exterior casing remains around, at, or below 140 degrees Fahrenheit, which may beneficially allow the outer casing to be safe-to-touch while the inner cook box is still in use.

In some examples, the cook box 160 may include a plurality of heat fins (not shown) that may aid in dissipating the heat collected by the cook box 160 to an ambient fluid medium (e.g., air). In operation, the cook box 160 and its heat fins may be much hotter than the surrounding air, such that convection currents transfer the heat to surrounding air to migrate heat energy away from the cook box 160. The outer casing 155 may be perforated (not shown), such that ambient air is allowed to flow to/from the cook box 160, thus beneficially increasing convection heat transfer. Cool ambient air may be drawn in through apertures on the outer casing 155 of the grill 150, and convection flow 190 may cause the air that is drawn in to rise and flow around the cook box 160, thus extracting heat energy and eventually exiting as heated air flow 190 through the apertures in the outer casing 155.

In various examples, the cook box 160 may radiate energy in the form of electromagnetic radiation 195 (e.g., infrared energy) at various frequencies and wavelengths. The radiated energy 195 may be absorbed by (e.g., at an inner surface of) the cook box 160, which may then dissipate that energy via any of the above three types of heat energy transfer mechanisms, either alone or in combination. Accordingly, the grill 150 may advantageously leverage the physical phenomenon of conduction, convection, and radiation to substantially thermally isolate the outer casing 155 from the cook box 160 and maximize the amount of thermal energy dissipated by the cook box 160 within safe operational parameters (e.g., without burning a person that handles the grill 150).

Figure 2A:
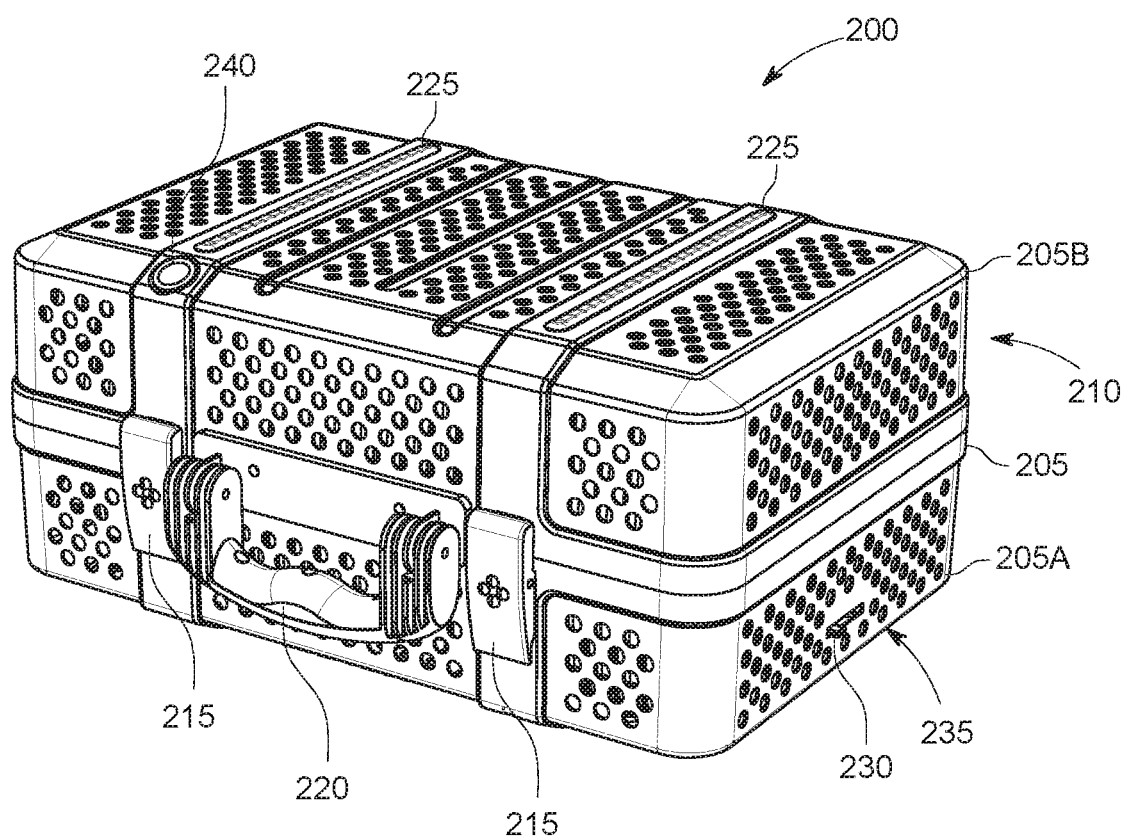
FIGS. 2A-2G depicts various views of an exemplary portable grill in a closed state.
Figure 2B:
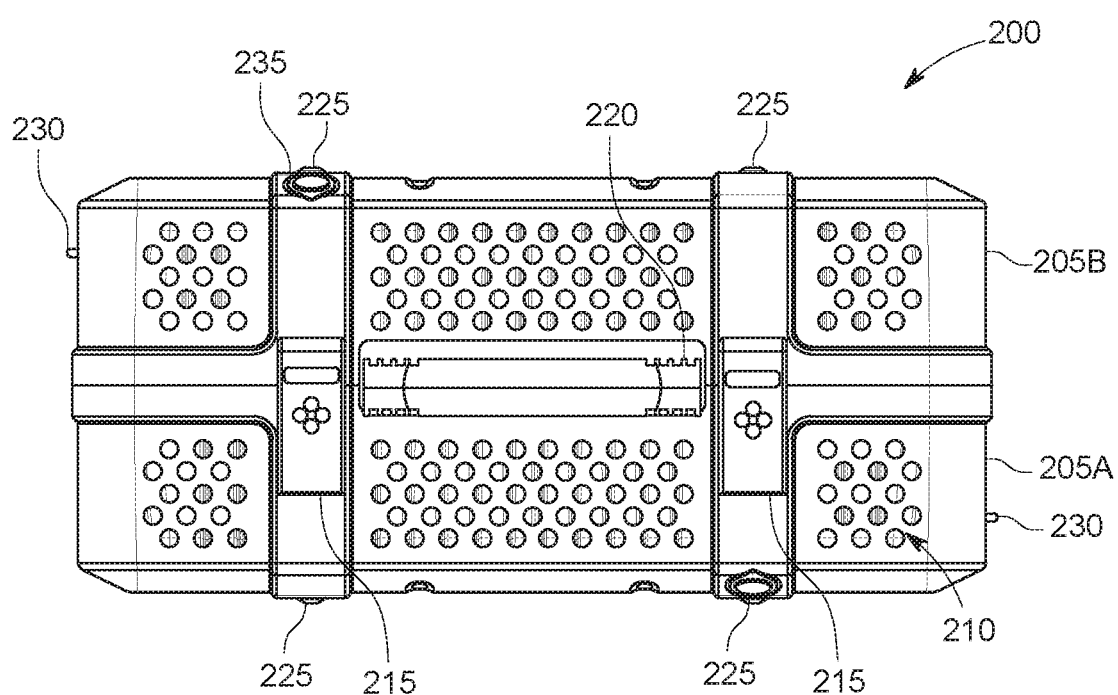
Figure 2C:
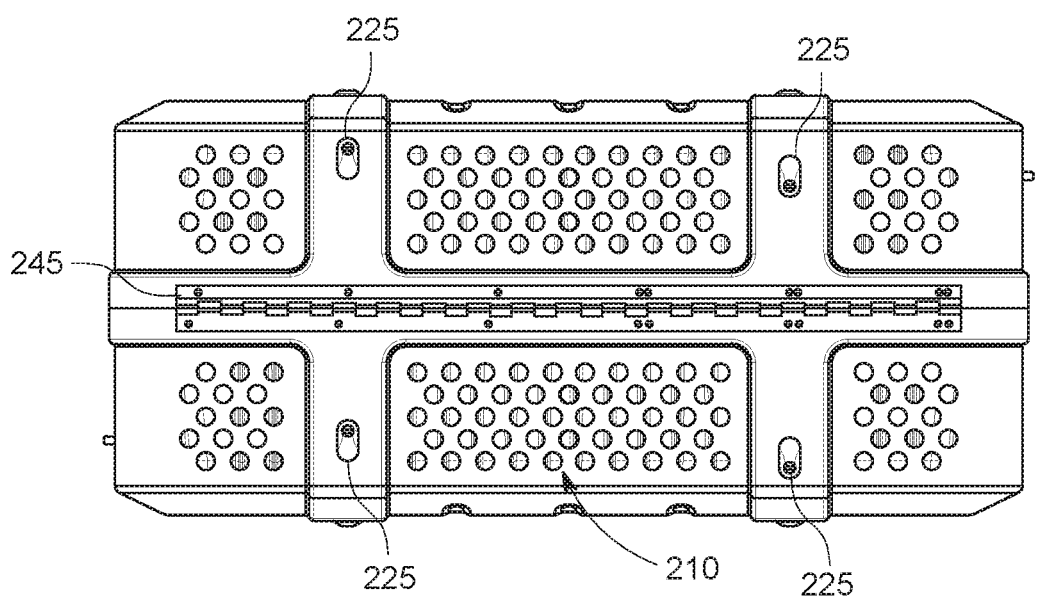
Figure 2D:
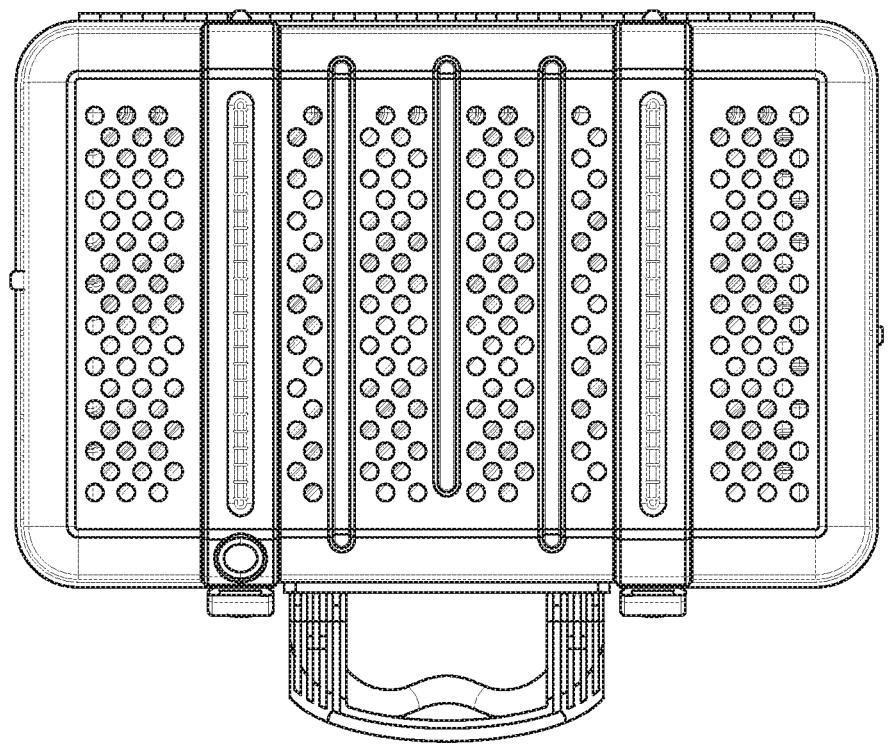
Figure 2E:
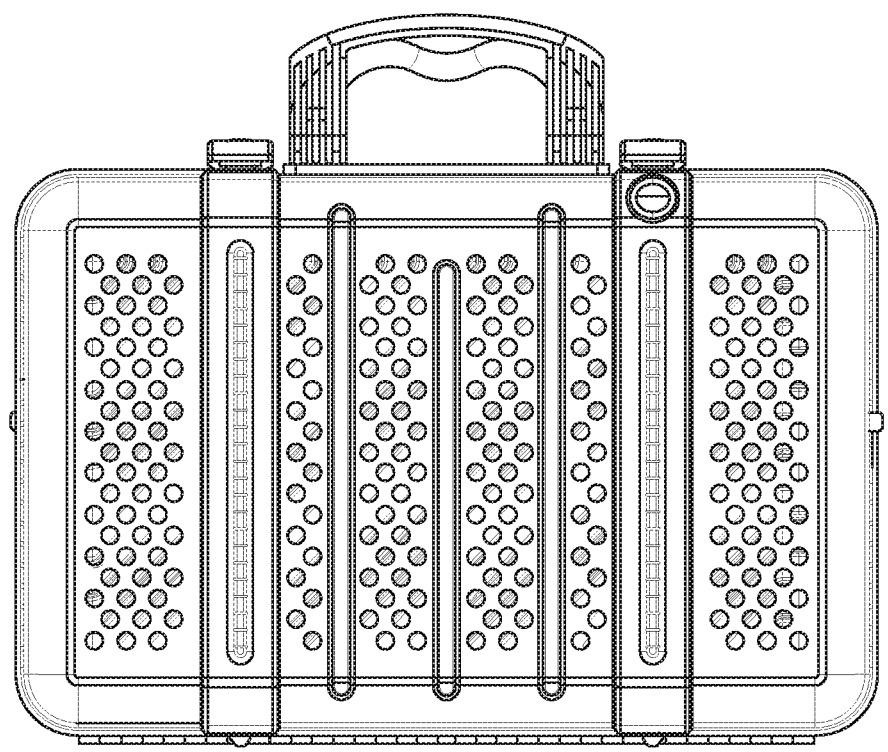
Figure 2F:
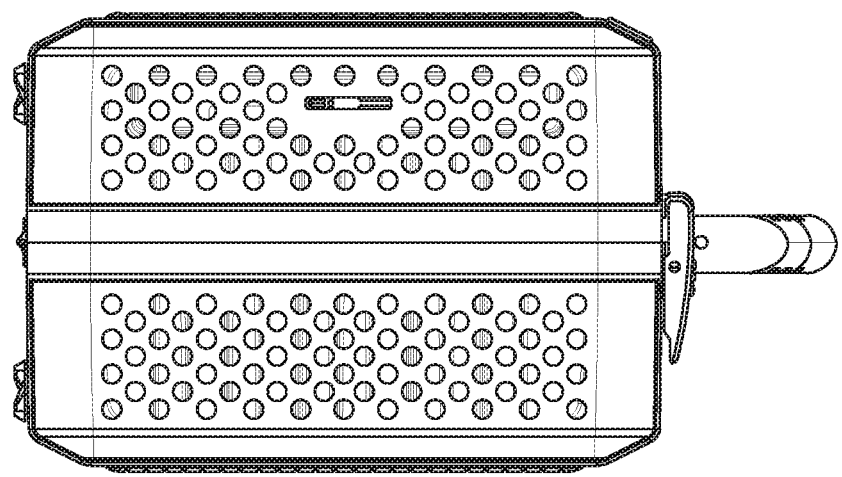
Figure 2G:
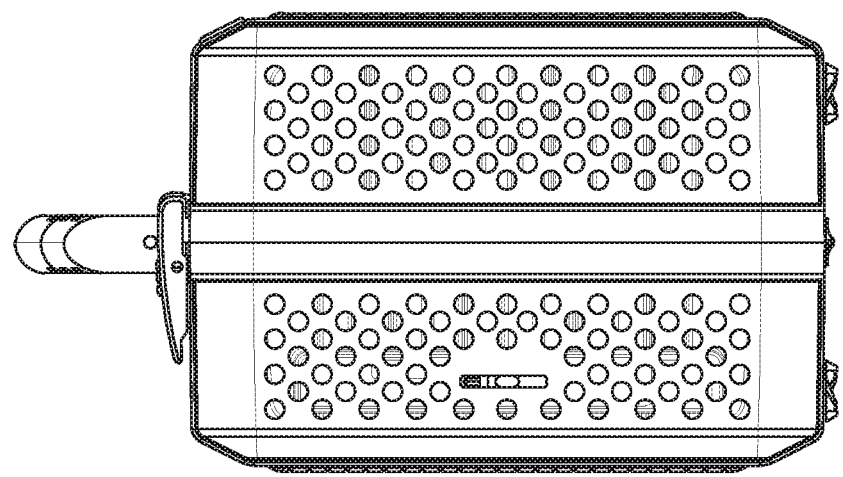

FIGS. 2A-2G depicts various views of an exemplary portable grill in a closed state. FIG. 2A depicts a perspective view of the exemplary portable grill 200 in a closed state. FIG. 2B depicts a front elevational view of the exemplary portable grill 200 in a closed state. FIG. 2C depicts a back elevational view of the exemplary portable grill 200 in a closed state. FIG. 2D depicts a top plan view of the exemplary portable grill 200 in a closed state. FIG. 2E depicts a bottom plan view of the exemplary portable grill 200 in a closed state. FIG. 2F depicts a right side elevational view of the exemplary portable grill 200 in a closed state. FIG. 2G depicts a left side elevational view of the exemplary portable grill 200 in a closed state.

The portable grill 200 includes an outer casing 205. The outer casing 205 includes a bottom (base) section 205A and a top (lid) section 205B hingedly coupled (at a rear side) to the bottom (base) section 205A. The outer casing 205 includes a plurality of convective flow apertures 210 that facilitate fluid flow between an interior of the outer casing 205 and an external ambient environment. The bottom and top sections 205A, 205B, in this exemplary depiction, are held shut by a pair of latches 215. The portable grill 200 further includes a handle 220 that is pivotably coupled with the outer casing 205 to facilitate carrying of the grill 200. The grill 200 includes support members 225 (shown as strips of silicone, for example) located along at least one exterior surface of the outer casing 205, so as to provide additional clearance for air flow on a side of the grill that may be supported by a support surface (e.g., a table or the ground). The supports 225 may also be formed of a thermally insulative material, such that the supports 225 do not conduct a significant amount of heat from the grill 200 to the support surface. The grill 200 further includes a ventilation flap adjuster 230 (e.g., shown as a tab protruding from a slot 235 in the outer casing 205). The ventilation flap adjuster 230 may be configured to selectively adjust a level of ventilation provided to the internal compartment of the cook box via a ventilation flap (not shown) of the cook box. The grill 200 also includes a removable thermometer 240 configured with a probe end (not shown) that is in conductive thermal communication with an inner cook box (not shown). The thermometer 240 may be visually inspected by a user to indicate the temperature ($T_1$) of the inner cook box, which may advantageously allow a user to monitor the cooking temperature and heat level in the cook box (e.g., so the food being cooked isn't over- or under-cooked).

As shown in FIGS. 2B, 2F, and 2G, in at least some embodiments, the grill 200 includes two ventilation flap adjusters 230 on opposite lateral sides of the grill 200. In the depicted embodiment, one adjuster 230 is shown at an upper vertical position of the grill 200, while the other adjuster 230 is shown at a lower vertical position of the grill 200. Including adjusters 230 (and their corresponding ventilation flaps) on opposite sides and opposite vertical positions of the grill 200 may facilitate improved fluid flow and ventilation through the cook box (e.g., cold air flowing into the bottom vent of the cook box, and hot air flowing out of the top vent of the cook box). The adjusters 230 and corresponding flaps of the grill 200 may further provide for ambient air (which includes oxygen) to cycle through the interior of the cook box to facilitate combustion of burning fuel in the cook box.

As depicted in FIG. 2C, the supports 225 include a plurality of feet 225 located on a bottom surface of the outer casing 205. Also shown in FIG. 2C is a hinge 245 that hingedly couples the casing bottom section 205A with the casing top section 205B.

Figure 3A:
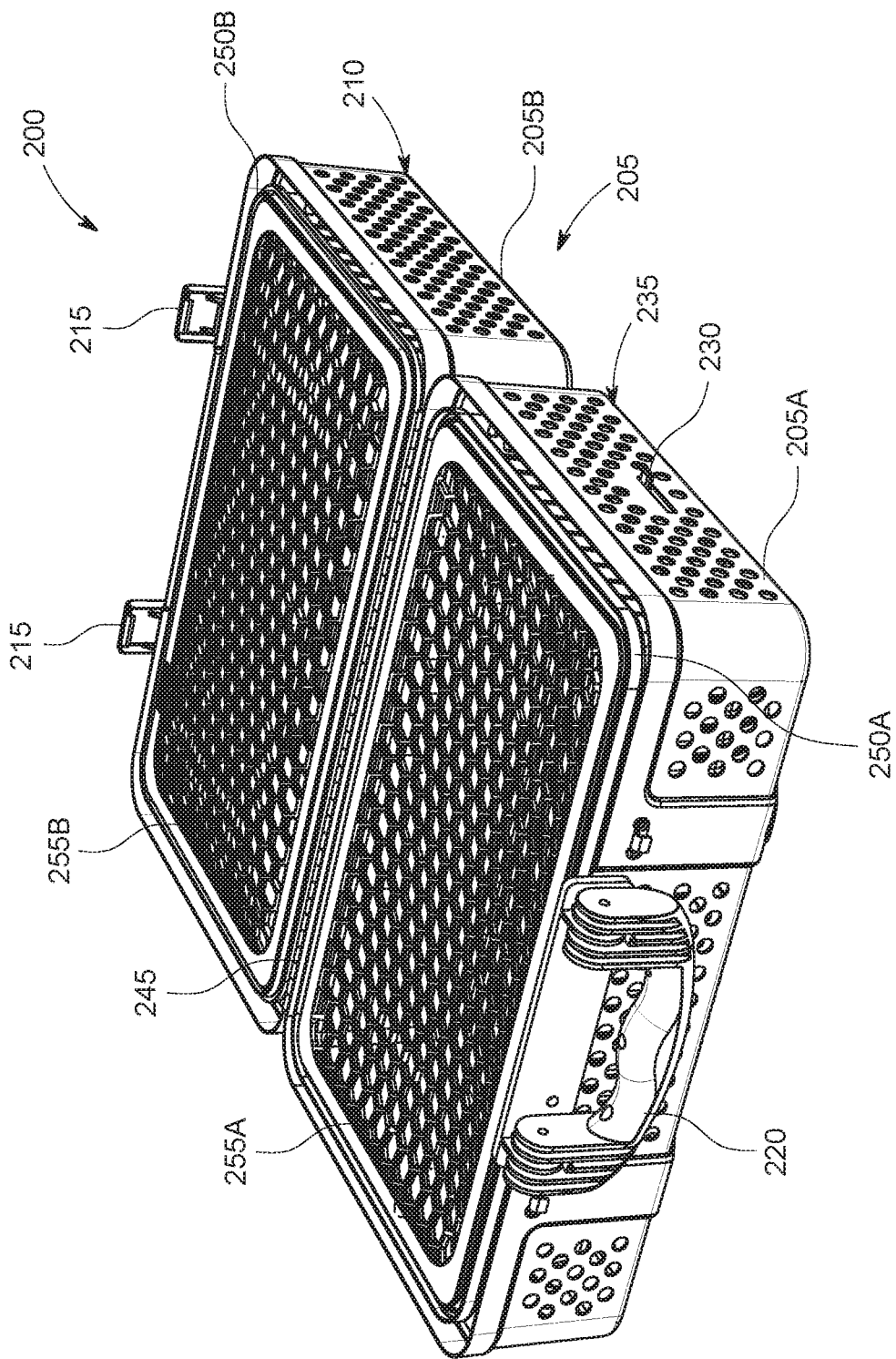
FIGS. 3A-3G depicts various views of an exemplary portable grill in an open state.
Figure 3B:
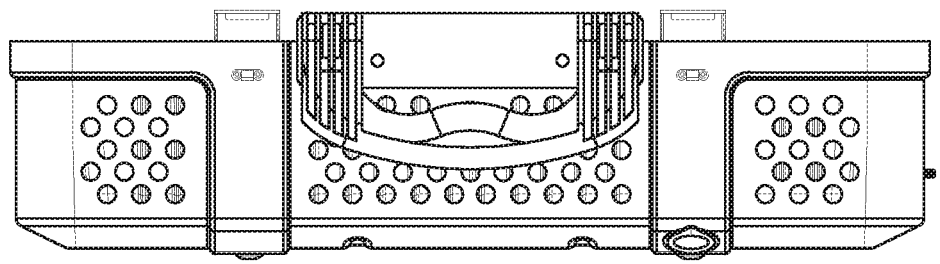
Figure 3C:
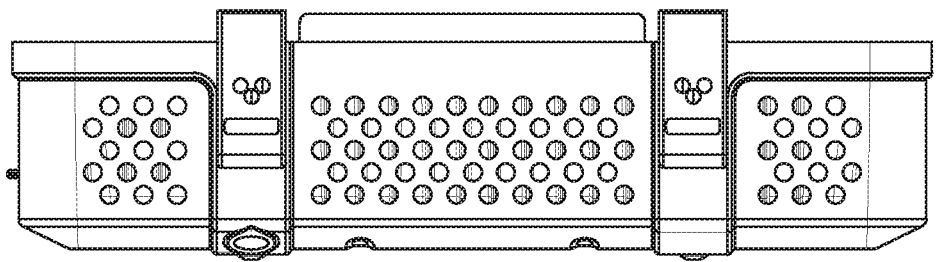
Figure 3D:
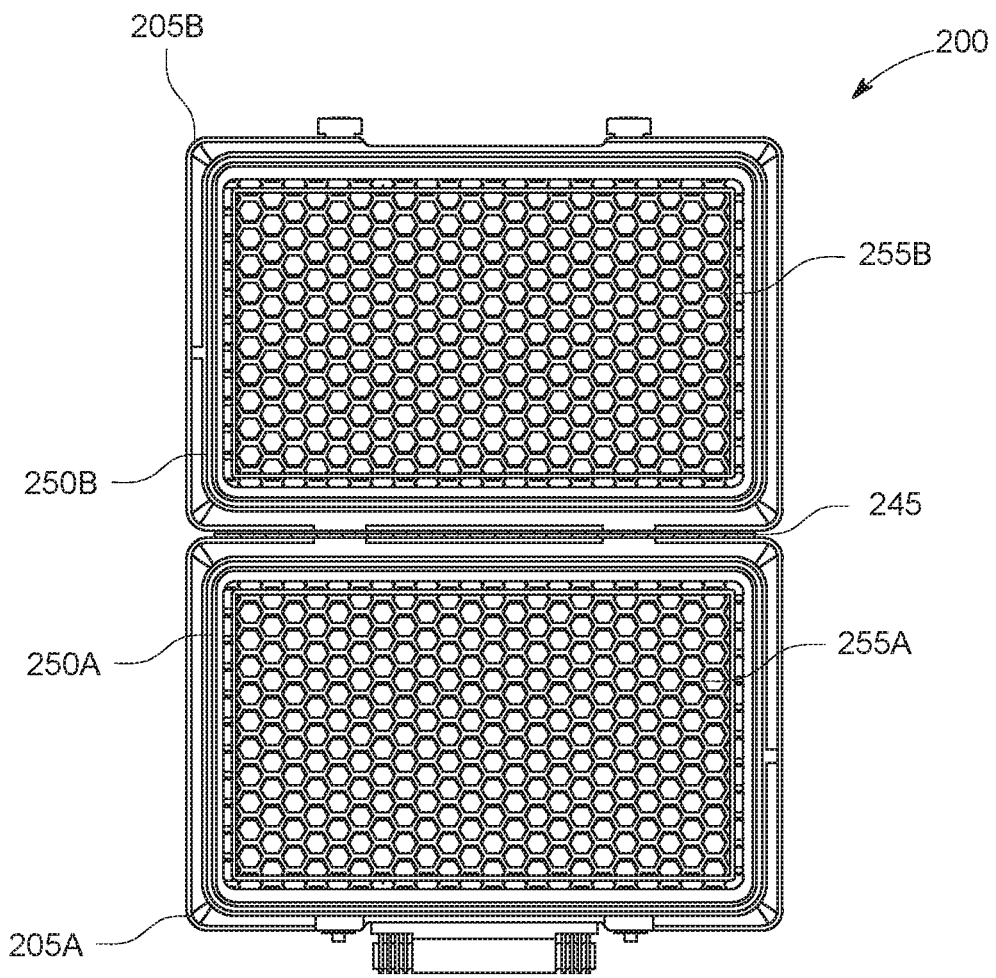
Figure 3E:
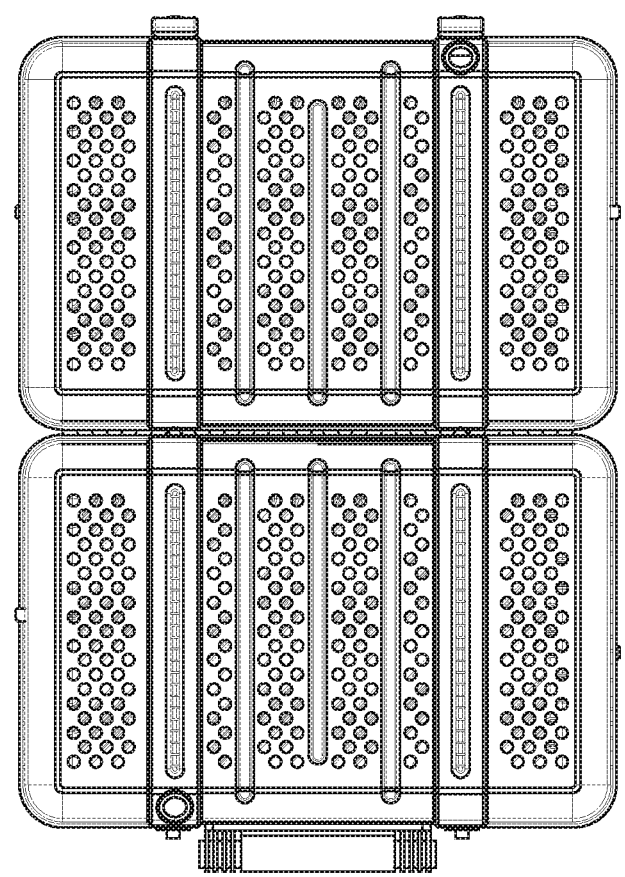
Figure 3F:
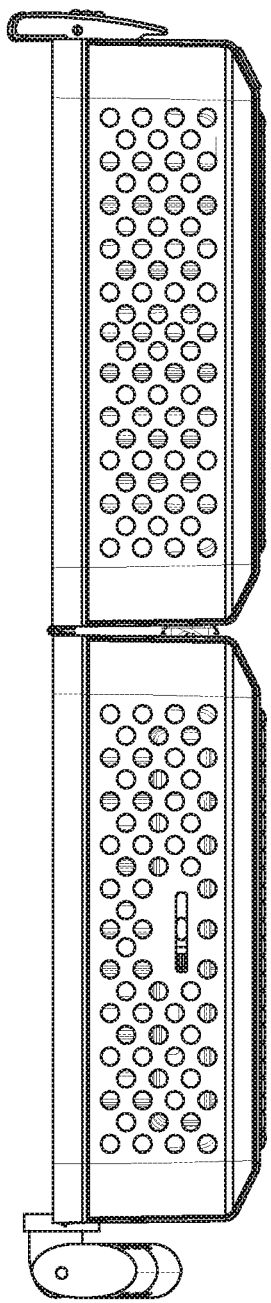
Figure 3G:
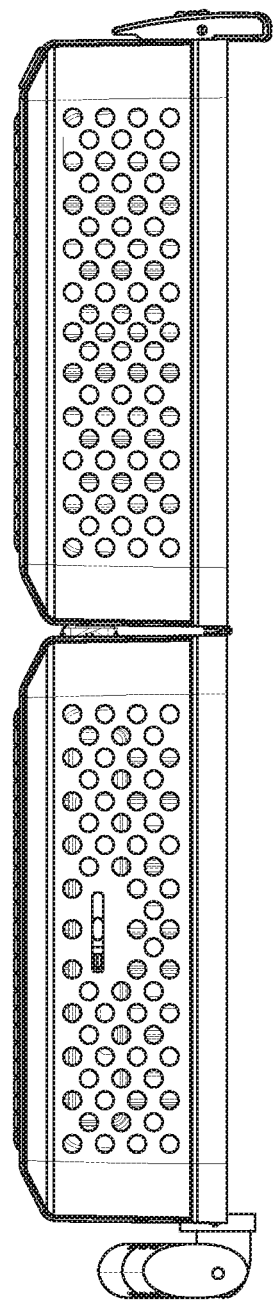

FIGS. 3A-3G depicts various views of an exemplary portable grill in an open state. FIG. 3A depicts a perspective view of the exemplary portable grill 200 in an open state. FIG. 3B depicts a front elevational view of the exemplary portable grill 200 in an open state. FIG. 3C depicts a back elevational view of the exemplary portable grill 200 in an open state. FIG. 3D depicts a top plan view of the exemplary portable grill 200 in an open state. FIG. 3E depicts a bottom plan view of the exemplary portable grill 200 in an open state. FIG. 3F depicts a right side elevational view of the exemplary portable grill 200 in an open state. FIG. 3G depicts a left side elevational view of the exemplary portable grill 200 in an open state.

The grill 200 includes the bottom and top sections 205A, 205B of the casing 205. Fixedly coupled with the bottom casing section 205A is a bottom cook box section 250A. Similarly, fixedly coupled with the top casing section 205B is a top cook box section 250B. The bottom and top cook box sections 250A, 250B form the cook box 250 (shown in FIGS. 5A-5G). Supported by the bottom cook box section 250A is a bottom grilling grate 255A. Similarly, supported by the top cook box section 250B is a top grilling grate 255B. In some examples, the grilling grates 255A, 255B may be removable from the sections 250A, 250B, and may sit atop a ledge of the sections 250A, 250B, respectively. In some embodiments, the center point of each grate 255A, 255B may vertically extend above the outer perimeter of each grate 255A, 255B. For example, each grate 255A, 255B may have a dome-shaped structure, such that there is increased clearance below each grate to provide additional space for burning fuel in the cook box 250.

Figure 4:
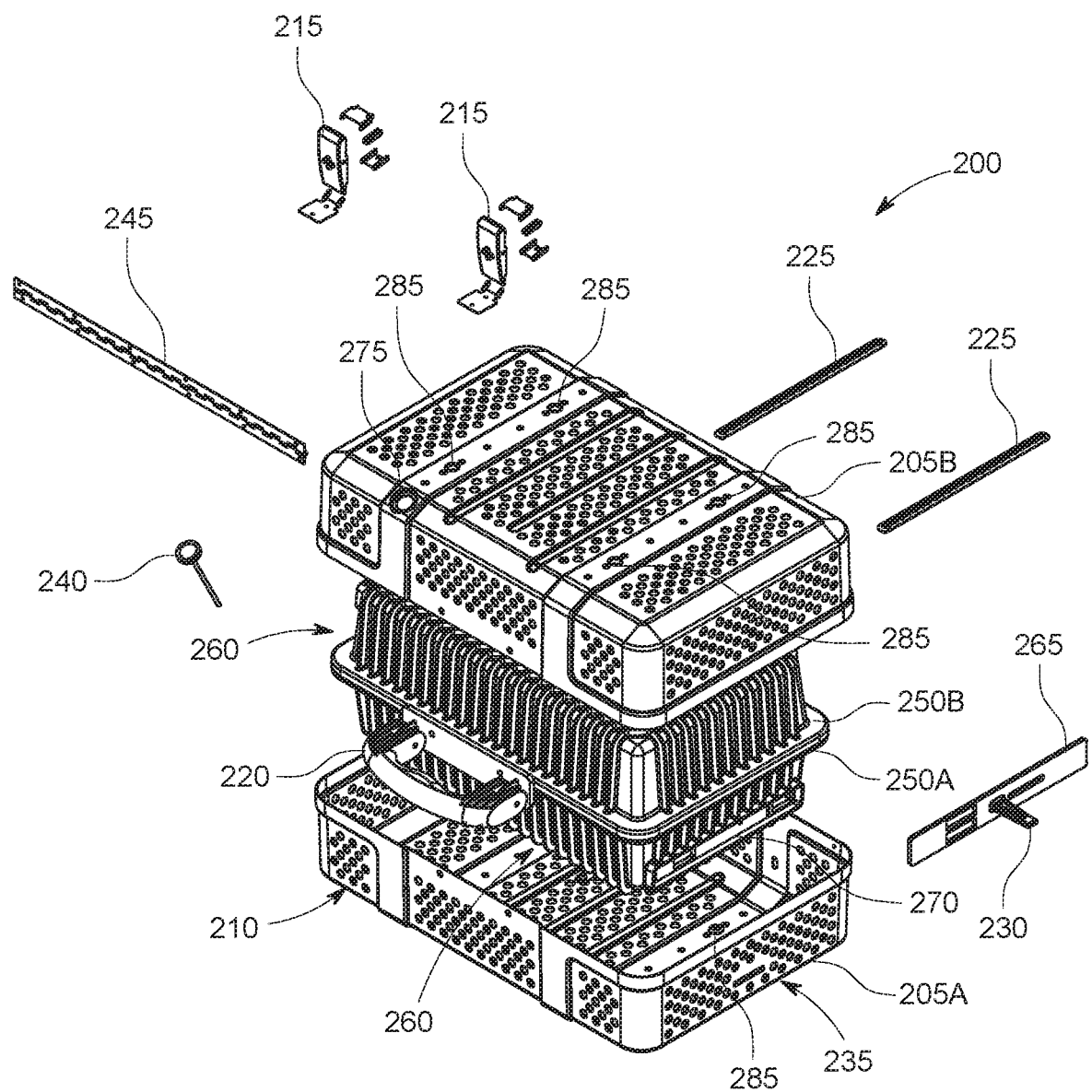
FIG. 4 depicts an exploded view of an exemplary portable grill.

FIG. 4 depicts an exploded view of an exemplary portable grill. The grill 200 includes the outer casing 205 and the inner cook box 250. Located on exterior surfaces of the cook box 250 are a plurality of cooling fins 260. The cooling fins 260 may aid in dissipating the thermal energy collected by the cook box 250 to an ambient fluid medium (e.g., surrounding air). In this sense, the cook box 250 may act as a heatsink to collect heat from a heat source and dissipate the collected heat via convection currents around the fins 260. The grill 200 includes a ventilation flap 265 having the ventilation flap adjuster 230 configured to move in, and extend through, the slot 235 of the outer casing 205. The ventilation flap 265 is configured to couple with, and slide within, a flap channel 270 of the cook box 250. In various examples, the flap 265 and the channel 270 may employ magnets that cooperate to place the flap 265 in one of a plurality of flap positions (e.g., closed, partially open, and open). The flap channel 270 may include at least one vent aperture to facilitate fluid flow between the interior of the cook box 250 and ambient air.

The outer casing 205 is shown as having a plurality of attachment holes 285. Each attachment hole 285 may be configured to receive a fastener (e.g., a screw) to fixedly fasten the bottom/top portions 205A, 205B of the outer casing 205 to respective bottom/top portions 250A, 250B of the inner cook box 250 (e.g., via bosses 280 discussed below). In various examples, the support 225 (which may be silicone strips, for example) may extend over an attachment hole 285 of the outer casing 205, which may advantageously shield a fastener lying in the attachment hole 285 from being physically touched by a person (as the fastener may be quite hot as the fastener may be in thermal conductive engagement with the cook box 250). Such shielding is further illustrated in the drawing of FIG. 7C. The grill 200 also includes a thermometer hole 275 in the outer casing 205 configured to receive the thermometer 240.

Figure 5B:
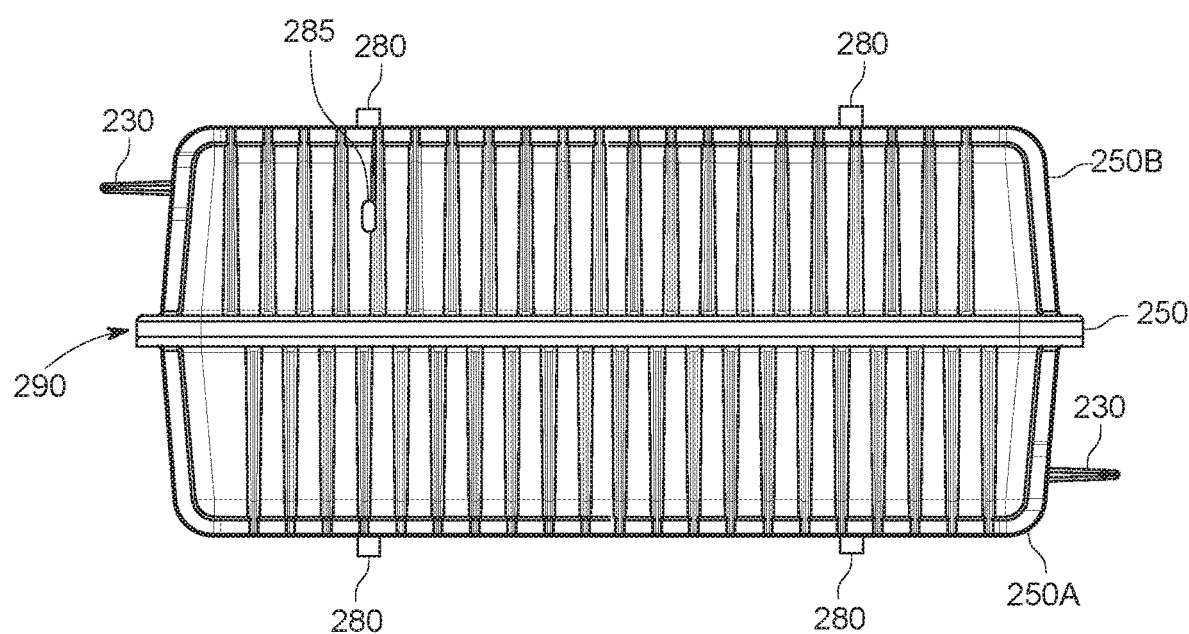
Figure 5C:
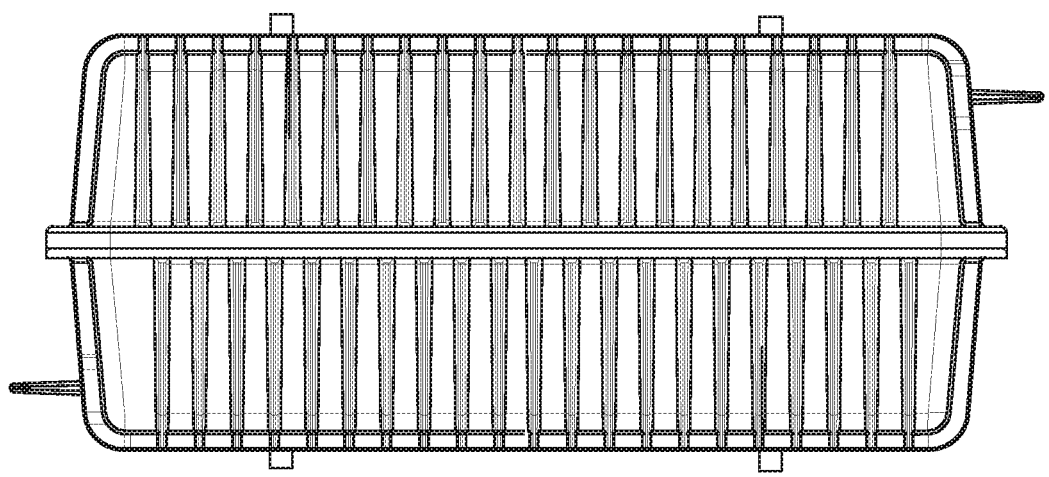
Figure 5D:
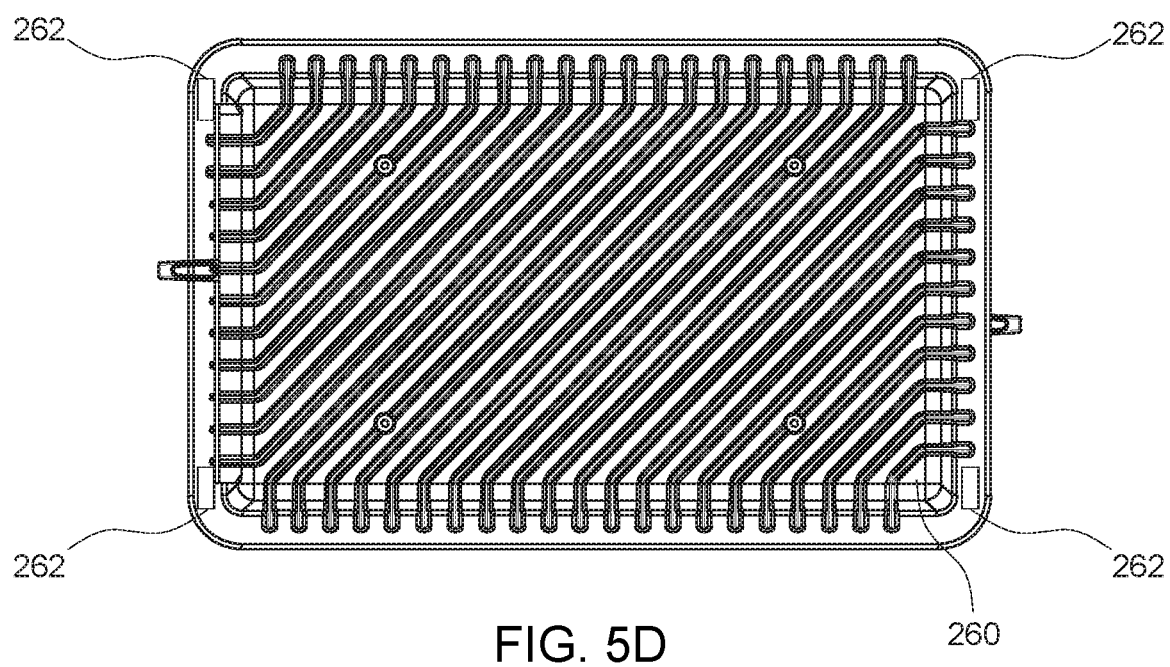
Figure 5E:
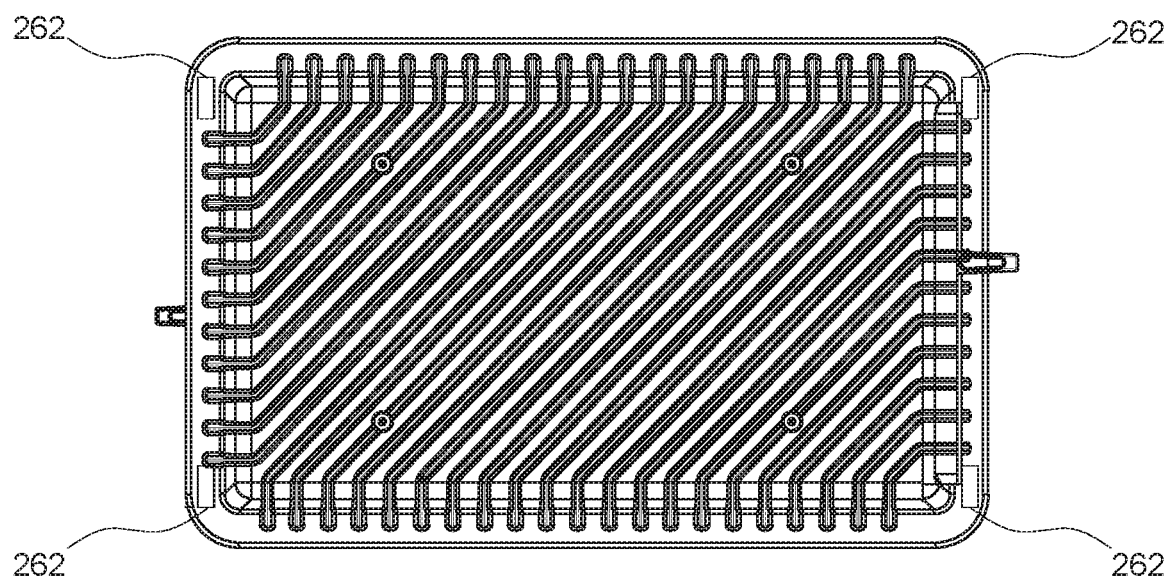
Figure 5F:
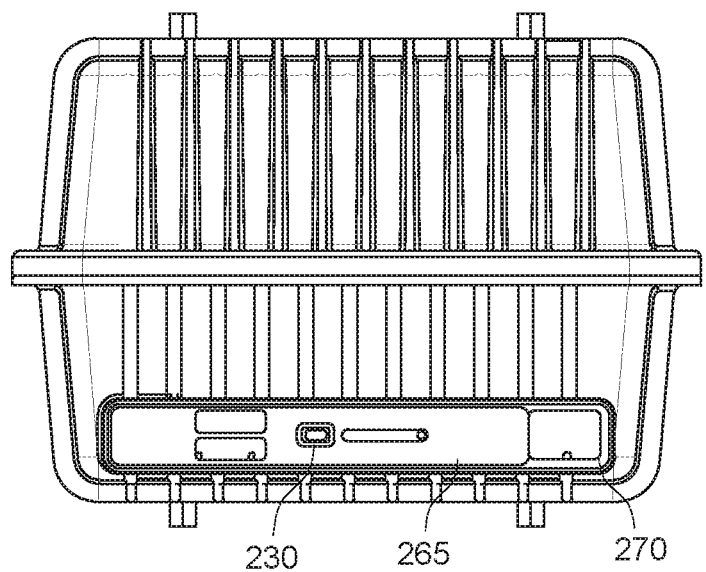
Figure 5G:
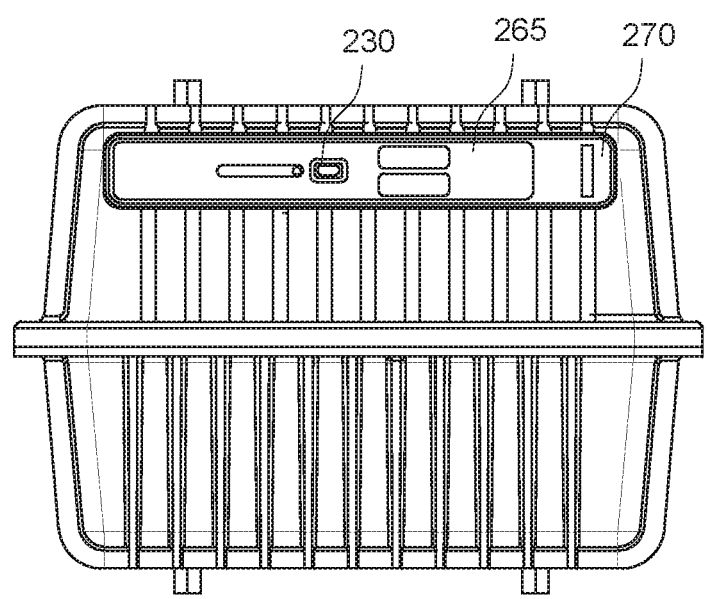

FIGS. 5A-5G depicts various views of an exemplary portable grill with an exterior casing removed to show the outer surface of a cook box/heatsink. FIG. 5A depicts a perspective view of the exemplary portable grill 200 without the outer casing 205. FIG. 5B depicts a front elevational view of the exemplary portable grill 200 without the outer casing 205. FIG. 5C depicts a back elevational view of the exemplary portable grill 200 without the outer casing 205. FIG. 5D depicts a top plan view of the exemplary portable grill 200 without the outer casing 205. FIG. 5E depicts a bottom plan view of the exemplary portable grill 200 without the outer casing 205. FIG. 5F depicts a right side elevational view of the exemplary portable grill 200 without the outer casing 205. FIG. 5G depicts a left side elevational view of the exemplary portable grill 200 without the outer casing 205.

The grill 200 (as shown with the outer casing 205 removed) includes the cook box 250 having bottom section 205A and a top section 205B. The cook box 250 is shown as having the fins 260 on multiple outer surfaces of the cook box 250 (e.g., sides, top, and bottom). The flap 265 (having flap adjuster 230) is shown assembled with the flap channel 270. In the depictions of FIGS. 5A-5G, the flap 265 is shown as being in an "open" state (where the holes in the flap 265 are aligned with the holes in the flap channel 270 to permit fluid flow into/out of the interior of the cook box 250.

The cook box 250 in this exemplary embodiment also includes a plurality of bosses 280. The bosses 280 may be integrally formed with the cook box 250 (e.g., the bottom bosses 280 and the bottom cook box section 250A may be a single piece of machined metal, while the top bosses 280 and the top cook box section 250B may be a single, different piece of machined metal). In various examples, the bosses 280 may be welded onto the cook box 250. The bosses 280 may cooperate with a fastener (e.g., a screw) to fixedly couple the sections of the cook box 250 to their corresponding sections of the outer casing 205. The bosses 280, along with their complementary screws, may form the attachment members (e.g., FIG. 1B, members 180) configured to substantially thermally isolate the outer casing 205 from the inner cook box 250. In the exemplary depiction of FIGS. 5A-5G, eight bosses 280 are shown (four on the top of the cook box, and four on the bottom of the cook box). These eight bosses may respectively cooperate with the eight attachment holes of the outer casing 205 and eight fasteners (screws) to provide eight different thermal attachment members (eight thermal "chokepoints") that limit the heat transfer from the cook box to the outer casing.

When the bottom and top sections 250A, 250B (two halves) of the cook box 250 are assembled together, they may form a perimeter seal 290. The perimeter seal 290 may limit the amount of air flow through the interior of the cook box 250 to only the air flow permitted by the flaps 265. The perimeter seal 290 may also result in the cook box 250 substantially enclosing the food item being cooked within the cook box 250, to provide for increased heating of the food from all directions (e.g., since the cook box 250 efficiently conducts the thermal energy generated by the heat source burning within the cook box 250). The cook box 250 may also include a thermometer hole 290 configured to receive a probe end of the thermometer 240, thus allowing an inner temperature of the cook box 250 to be measured from outside the outer casing 205.

Figure 6:
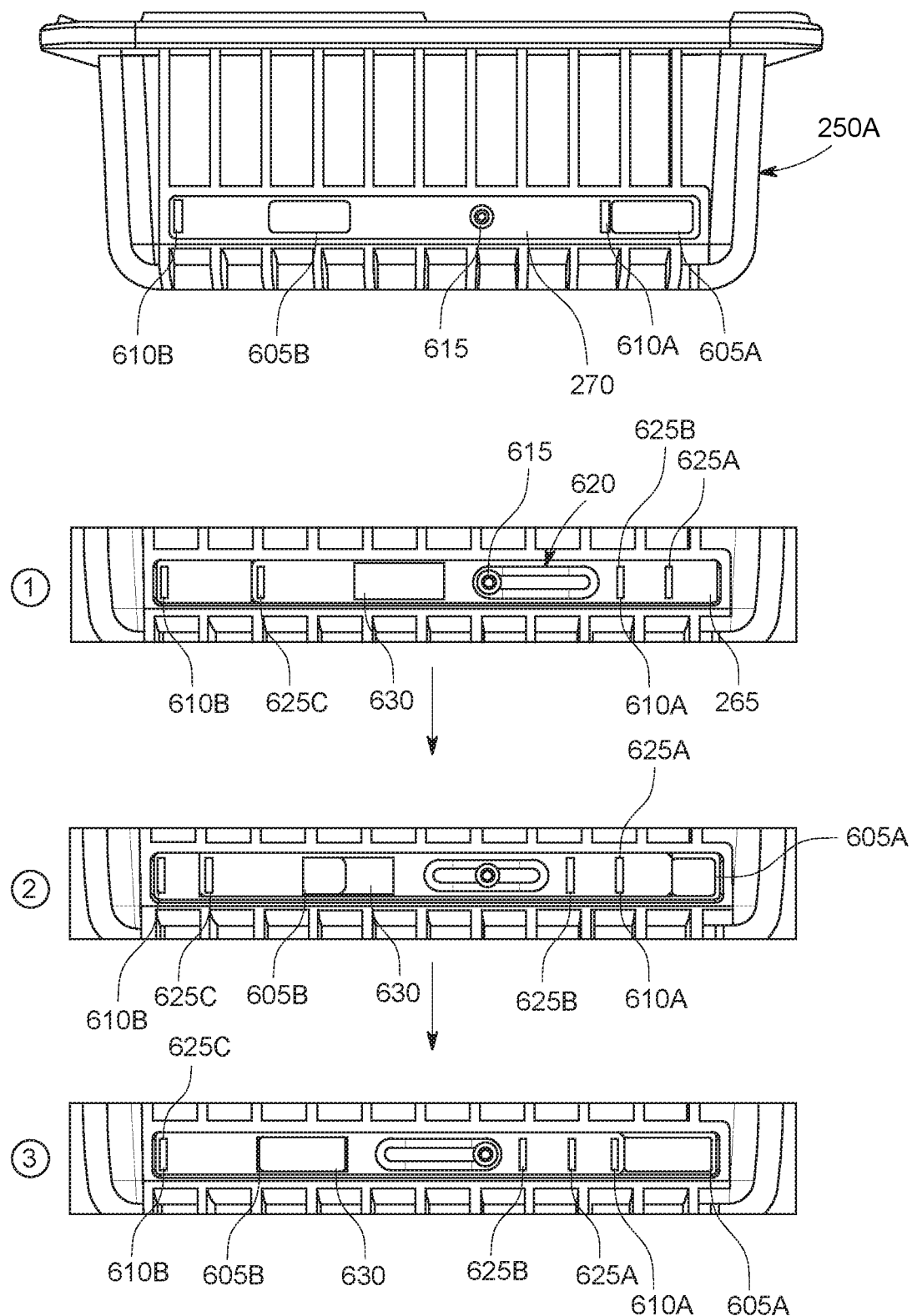
FIG. 6 depicts side elevational views of an exemplary slide ventilation flap for selectively controlling a level of fluid flow through an interior of a cook box.

FIG. 6 depicts side elevational views of an exemplary slide ventilation flap for selectively controlling a level of fluid flow through an interior of a cook box. As shown at the top of FIG. 6, a bottom cook box section 250A includes a flap channel 270. The section 250A also includes at least one ventilation aperture (e.g., first ventilation aperture 605A and second ventilation aperture 605B). The apertures 605A, 605B are located, for example, on the flap channel 270. Included with the section 250A is a channel guide 615, which may be in the form of a bolt or pin fixed to the section 250A, for example. The channel guide 615 may cooperate with a channel of a flap to facilitate controlled translation/sliding of the flap within the channel 270. The section 250A/channel 270 also includes at least one magnet (e.g., first channel magnet 610A and second channel magnet 610B). The magnets 610A, 610B may cooperate with magnets on a ventilation flap to position, magnetically couple, and retain the flap in one of a plurality of flap positions (e.g., closed, partially-open, and open).

For example, in a first step (1) of a three step sequence (1)-(3) shown in FIG. 6, a ventilation flap 265 is located within the flap channel 270. In this first step (1), the flap channel 270 and flap 265 are shown in a "closed" configuration (e.g., where the apertures 605A, 605B of the cook box section 250A are covered by the flap 265). Sliding of the flap 265 within the flap channel 270 is aided by a guide channel 620 of the flap 265 that receives the channel guide 615 to properly guide the flap 265 as it is translated within the flap channel 270. The flap 265 includes at least one magnet (e.g., first flap magnet 625A, second flap magnet 625B, and third flap magnet 625C). In the closed state shown in step (1), the first channel magnet 610A and the second flap magnet 625B are (translationally) aligned to retain the flap 265 in the closed state, while the other magnets 610B, 625A, and 625C are not aligned with one another. The flap 265 also includes a flap aperture 630 that is configured to align with the second ventilation aperture 605B in the open state to facilitate ventilation and oxygen delivery to the interior of the cook box 250.

Moving from the closed state of step (1) to the partially-open state of step (2), the flap 265 has been translated to the left by a user (perhaps using the tab 230 shown in FIG. 5A, for example) to partially uncover the apertures 605A, 605B. In the partially open state, the first channel magnet 610A and the first flap magnet 625A are (translationally) aligned to retain the flap 265 in the partially open state, while the other magnets 610B, 625B, and 625C are not aligned with one another. The partially open state may allow for an intermediate level of ventilation through the interior of the cook box 250.

Moving from the partially-open state of step (2) to the fully open state of step (3), the flap 265 has been further translated to the left by a user (perhaps using the tab 230 shown in FIG. 5A, for example) to uncover the apertures 605A, 605B. In the fully open state, the second channel magnet 610B and the third flap magnet 625C are (translationally) aligned to retain the flap 265 in the open state, while the other magnets 610A, 625A, and 625B are not aligned with one another. The fully open state may allow for a maximum level of ventilation through the interior of the cook box 250.

Figure 7A:
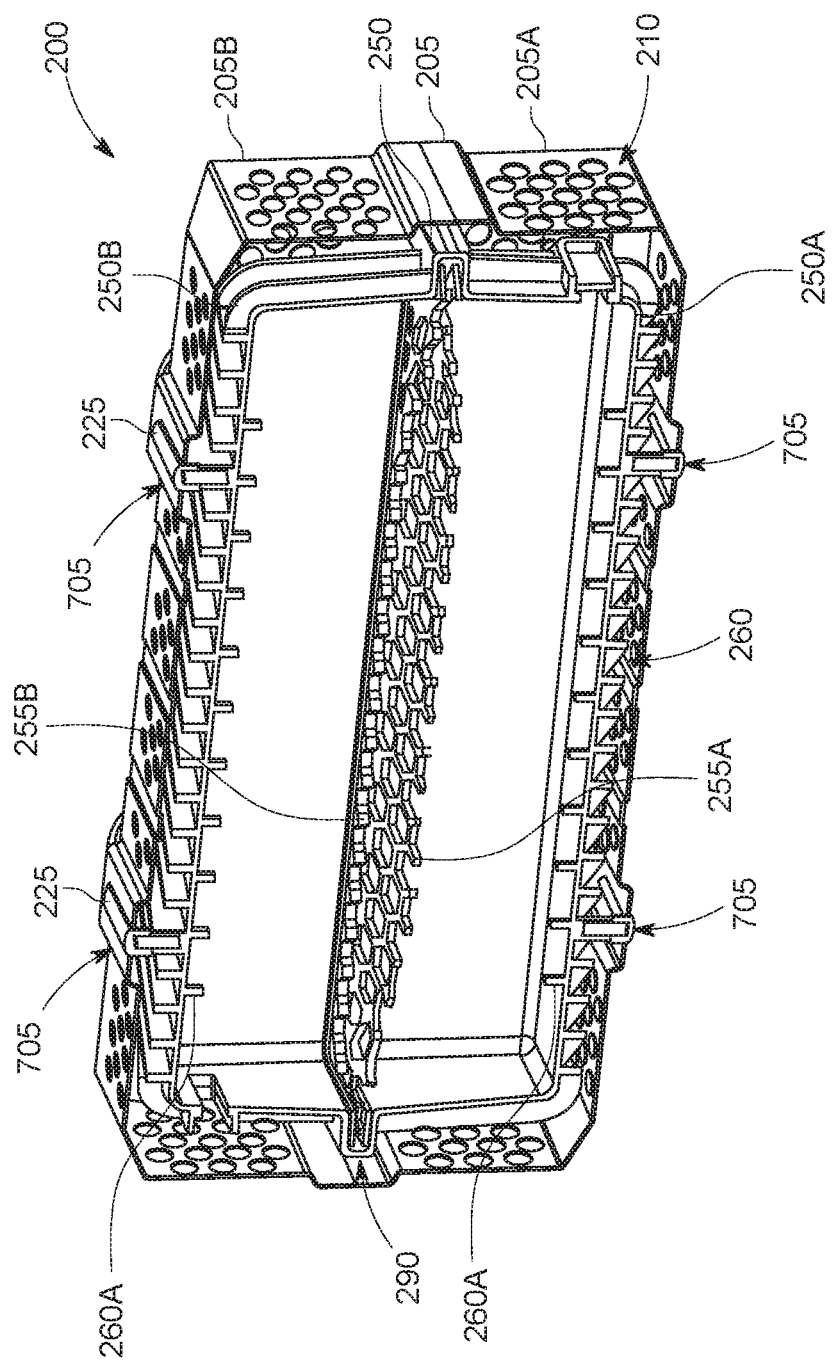
FIGS. 7A-7C depicts various cross-sectional views of an exemplary portable grill illustrating the mechanical and thermal attachment points to facilitate limited thermal conduction between an inner cook box/heatsink and an outer casing.
Figure 7B:
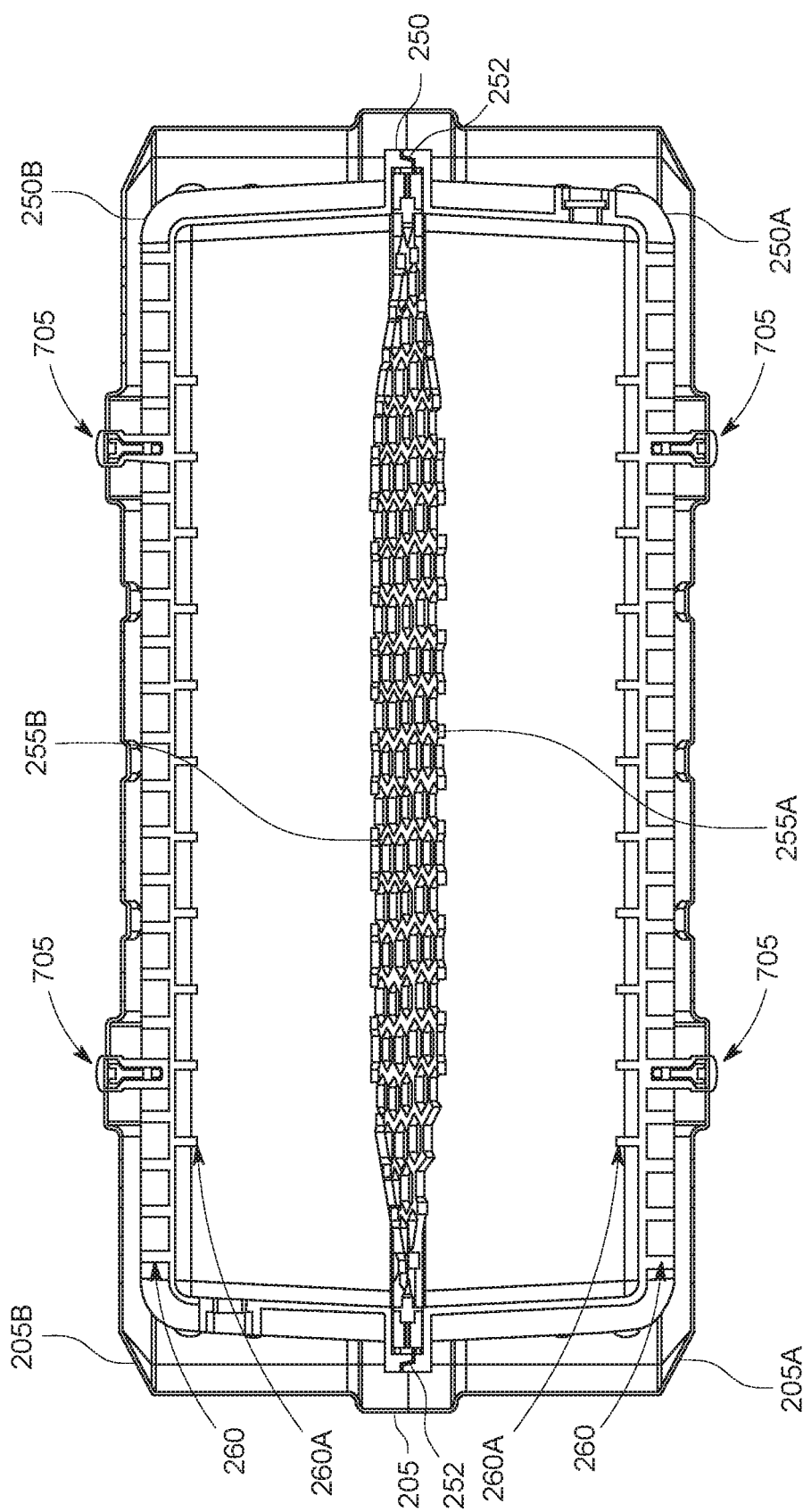
Figure 7C:
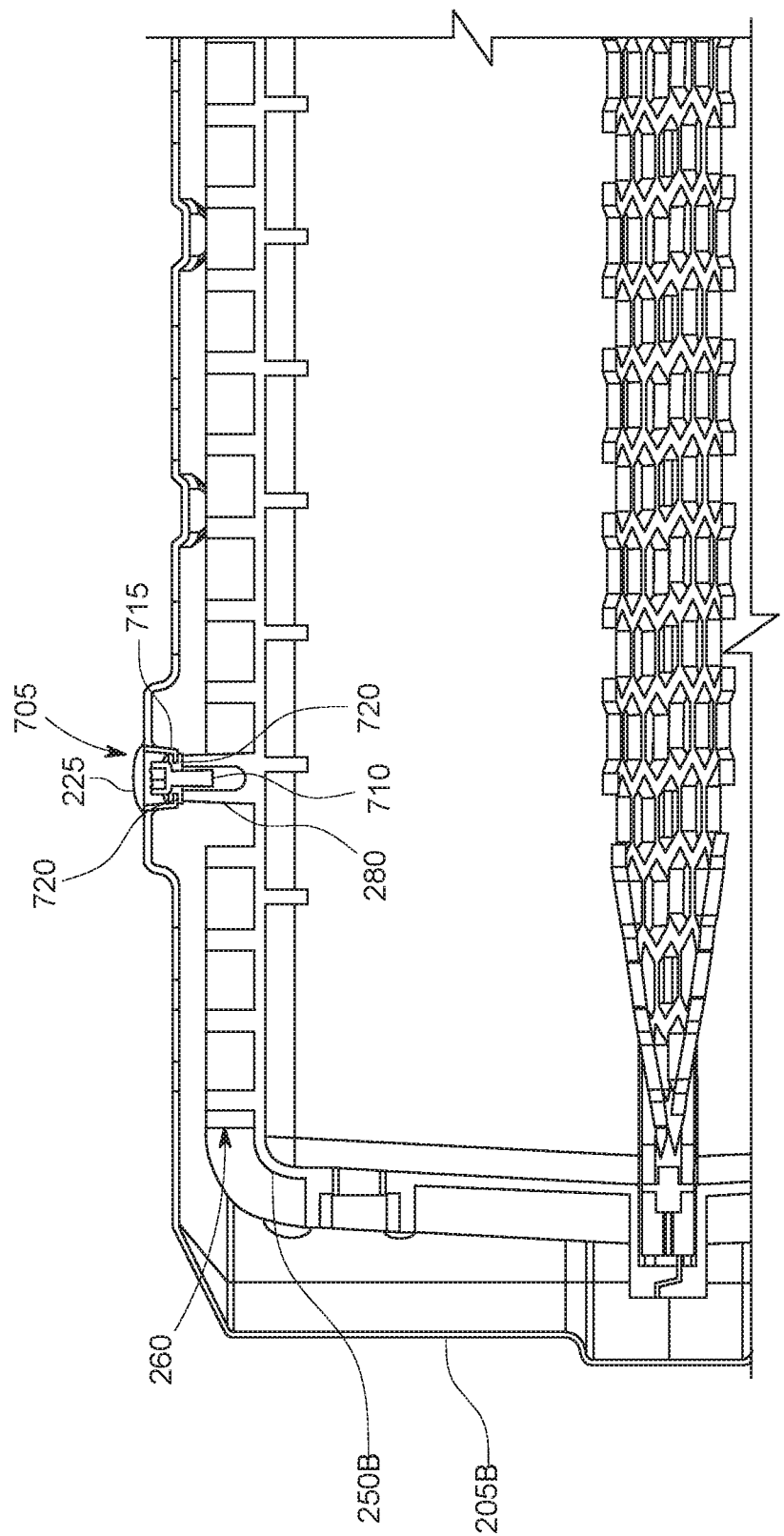

FIGS. 7A-7C depicts various cross-sectional views of an exemplary portable grill illustrating the mechanical and thermal attachment points (members) to facilitate limited thermal conduction between an inner cook box/heatsink and an outer casing. FIG. 7A depicts a perspective cross-sectional view, FIG. 7B depicts a front elevational cross-sectional view, and FIG. 7C depicts a zoomed in, front elevational cross-sectional view. The portable grill 200 includes the outer casing 205 (base 205A and lid 205B) and the inner cook box 250 (bottom 250A and top 250B). The outer casing base 205A is fixedly and mechanically coupled to the inner cook box bottom 250A via a plurality of attachment members 705. Similarly, the outer casing lid 205B is fixedly and mechanically coupled to the inner cook box top 250B via a plurality of attachment members 705. The attachment members 705 may be the same attachment members 180 depicted schematically in FIG. 1B. As described above with reference to FIG. 1B, attachment members 705/180 may facilitate limited thermal conduction between the outer casing 205 and the inner cook box 250 to keep the outer casing 205 as a much lower temperature than the cook box 250 when the grill 200 is in use.

FIG. 7C depicts a zoomed in cross-sectional view of an exemplary attachment member 705. As shown in this figure, the attachment member 705 includes a boss 280 of the cook box top 250B. The attachment member 705 further includes a screw 710 that is mechanically and fixedly coupled with the boss 280 (e.g., via complementary threaded features). The screw 710 passes through an attachment hole 285 passing through the outer casing lid 205B. By tightening the screw 710 in the boss 280 through the attachment hole 285, a compression force is created that mechanically and fixedly couples the outer casing lid 205B with the inner cook box top 250B. For example, a portion of the outer casing 205 may be sandwiched and compressed between the head of the screw 710 and a top surface of the boss 280. The attachment points corresponding to the attachment members 280 may be the only physical contact or thermally conductive path between the cook box 250 and the outer casing 205. By limiting the physical engagement between the outer casing 205 and the inner cook box 250 to just the attachment points of the attachment members 280, a high temperature cook box 250 may be substantially thermally isolated from the outer casing 205. Such an attachment configuration may beneficially allow the outer casing 205 to remain at or near room temperature while the cook box 250 is still hot (due to current or recent heating/usage, for example).

In various embodiments, the number of attachment members 280, their physical dimensions, and their physical properties (e.g., thermal conductivity) may be variables in a thermal energy transfer equation that governs the amount of heat energy conducted from the cook box to the outer casing. For example, given: (1) the thermal version of Ohm's law:

$$R_{th} = \frac{\Delta T}{\dot{Q}},$$

(2) the fact that the rules for combining resistances and conductances (in series and in parallel) are the same for both heat flow and electric current, and (3) the attachment member 280 are configured in parallel thermal circuit configuration, the total thermal resistance $R_{total}$ between the inner cook box and outer casing can be approximated in at least some embodiments by:

$$\frac{1}{R_{total}} = \frac{1}{R_1} + \frac{1}{R_2} + \ldots + \frac{1}{R_N}$$

Where N=the number of attachment members 280 that thermally and mechanically couple the inner cook box 250 to the outer casing 205, and $R_1$-$R_N$ are the individual thermal resistances of each respective attachment member 280. In the exemplary case where $R_1=R_2=\ldots=R_N=R_{th}$ and N=8, the above equation yields:

$$\frac{1}{R_{total}} = \frac{8}{R_{th}}, \text{ or } R_{total} = \frac{R_{th}}{8}$$

Therefore, the number of attachment members 280, their physical dimensions, and their physical properties (e.g., thermal conductivity) may be optimized, in various embodiments, to achieve a value of $R_{total}$ that substantially minimizes an amount of thermal conduction between the inner cook box and the outer casing, while at the same time, beneficially providing for a strong, rigid/fixed, and reliable mechanical coupling of the cook box to the outer casing.

The outer casing 205 may include a recessed portion 715. Located within the recessed portion 715 may be the attachment hole 285. The recessed portion 715 may lengthen a distance that thermal energy must travel from the cook box 250 to reach an exposed outer surface of the outer casing 205, which may beneficially conceal the hottest portion of the outer casing 205 (the portion in engagement with the screw 710 and the boss 280) from physical touch by a person handling the grill 200. The recessed portion 715 is shown as being covered by a support 225 (which may, for example, be a strip or foot that may be formed of a thermally insulating material, such as silicone). By covering the recessed portion 715 with the support 225, the (potentially) dangerously hot components (e.g., screw 710, boss 280), may be shielded from touch by a person handling the grill 200. In some examples, the attachment member 705 may further include thermally insulating material 720 located between the surfaces of the cook box 750 and the outer casing 705. For example, the material 720 may be a thermally insulative washer that sits between the head of the screw 750 and the top of the boss 280. In some examples, the material 720 may form a barrier that prevents direct physical contact (and consequently, direct thermal conduction) between the outer casing 205 and the inner cook box 250, which may beneficially further thermally isolate the safe-to-touch outer casing 205 from the too-hot-to-touch cook box 250.

The cook box 250 also includes a plurality of internal heating fins 260A. The internal fins may act as standoffs to raise the charcoal or combustible material up from the floor of the cook box, thus allowing better airflow to reach the charcoal or combustible material. The internal heating fins 260A may also increase the surface area of the interior of the cook box to maximize heat absorption on the heat spreader side of the heatsink/cook box, and more expeditiously transfer heat to the outer cooling fins (e.g., a "double sided" heat exchange). Also, as shown in FIG. 7C, the outer cooling fins 260 of the cook box 250 are in close proximity to the convection apertures 210 of the outer casing 205. Such close proximity of these two parts may allow for substantial amounts of cooling air to pass through the apertures 210 and convectively interact with the cook box 250 and its outer cooling fins 260, such that thermal energy is advantageously transported away from the (potentially very hot) cook box 250. Furthermore, the convection apertures 210 may be sufficiently sized to prevent persons (such as small children) from inserting a finger into an aperture, which would otherwise expose the person's finger to the potentially very hot inner contents of the grill 200. For example, each aperture 210 may have a diameter of about 0.25 cm, 0.5 cm, 1 cm, 2, cm, 3 cm or more.

Although various embodiments have been described with reference to the Figures, other embodiments are possible. For example, the physical dimensions of the attachment member 180, 705 may be optimized to specifically control a level of thermal conduction between the cook box 250 and the outer casing 205. To illustrate, the boss 280 diameter and/or screw 710 diameter may be chosen to maximize a level of thermal resistance coupling between the cook box 250 and the outer casing 205. In some embodiments, the thermal conductivity of various parts of the attachment members 705 may be optimized to specifically control a level of thermal conduction between the cook box 250 and the outer casing 205. For example, the boss 280, screw 710, and/or washer 720 may be formed of a material with high strength/durability that also possesses low thermal conductivity properties (e.g., ceramic, heat-resistant rubber, carbon composite). Designing the grill 200 with the above optimized physical parameters for the attachment members 180, 705 may yield a high thermal resistance (as determined by the thermal resistance equation above), to beneficially thermally isolate a hot cook box 250 from an exposed outer casing 205.

In various examples, an inner cook box may be mechanically supported (e.g., with a set of fasteners) to an outer casing. In some embodiments, the fasteners may releasably couple to bosses, for example, extending radially from the cook box. In some implementations, the boss-fastener couplings may provide thermally conductive paths for limited heat to flow from the cook box to the outer box. A thermally conductive (e.g., metallic) path may promote controlled heat dissipation from the cook box while cooking or when cooking is completed by restricting conductive heat transfer to a limited number of thermal chokepoints, each having a relatively small cross-sectional area for conducting heat energy. In some implementations, a substantially thermally resistive connection may be made to support the cook box within the outer box. In such embodiments, a material such as a high temperature plastic or ceramic may advantageously minimize the transfer of heat through conduction via the connection. Such examples may minimize the touch temperature of the outer casing, which may thereby further reduce the risk of injury when touched.

In various embodiments, a flap cover may be included with an exemplary portable grill apparatus. A cook box shown without a flap cover (see, e.g., FIG. 6) may include exposed vent holes that provide for fluid communication (e.g., air flow) between the inside of the inner cook box and the surrounding ambient atmosphere. A flap cover may allow for positive adjustment (by a user) to a predetermined number of discrete positions at predetermined throttle positions at which the magnets of the cook box and the magnets of the flap cover align with a preferred magnetic reluctance path. As such, various examples may provide positive manual position control over the vent so as to control the flow of air between the inside of the cook box and ambient air.

Various embodiments of a grill may be foldable (e.g., suitcase-style, or clamshell-design), and may therefore house two side-by-side cooking chambers and associated grates, advantageously offering maximum grill space (e.g., a grill may measure about 350, 375, 400, 425, or about 450 in$^2$ or more of surface area for grilling when opened flat), while also providing the user with the ability to remove one of the two cooking grates and utilize that emptied top or handle-side shell as a hood for smoking or baking.

Various embodiments may advantageously mitigate/prevent heat building up at the outer-most system surfaces, and not be too-hot-to-handle or cause conditions that produce a contact burn or injury. Various embodiments may dissipate heat more quickly than the that heat can build up at the outer-most system surface, thus allowing the outer surface of the grill to be more safe-to-the-touch, portable (while in use), and also allow a user to quickly "close-and-go" when the user is finished grilling and/or using the device. Various embodiments may be designed and engineered for increased personnel protection.

Various embodiments may provide optimized thermal management. By: (1) integrating heatsink design principles into the exterior profile of the cast aluminum cook boxes, and (2) integrating heatsink design principles into the perforated exterior case or outer shell that houses the cook boxes, various examples may provide the benefits of a passive heat exchanger that transfers the excess heat generated by a mechanical device to a fluid medium (e.g., ambient air), where heat may be quickly dissipated away from the device, thereby allowing regulation of the device's temperature at optimal levels. In some examples, thermal energy may be transferred from a high-temperature cook box device to a lower temperature fluid medium (e.g., ambient air). The power and British thermal units (BTUs) supplied by charcoal or combustible material may not be 100% efficient, so the extra heat that is produced may be detrimental to the function of the device. As such, a heat sink may be included in various embodiments to disperse that excess heat. The exterior of the unit may be cooled through this heat exchange and dissipation process, allowing the exterior to stay safe-to-touch and therefore safer to use (for increased personal protection purposes). Some embodiments may eliminate the need for persons to wait around for a grill to cool down before storing and/or moving the device, so that soon after dumping remaining embers, a user can pack the grill up in seconds, store the grill, and/or disembark with a cooled down grill. Various embodiments may advantageously moderate temperature by dissipating heat.

A heat sink/cook box may be designed to maximize its surface area in contact with the cooling medium surrounding it, such as ambient air. Factors that may be optimized to improve performance in exemplary implementations may include material choice (e.g., aluminum), fin orientation/protrusion design, and surface treatments/finishes. Various embodiments may include a cast aluminum cook box with integrated heat sink design to allow for superior thermal management. Designing a heat sink made of aluminum may advantageously yield a lightweight and high thermal conductivity design (e.g., approximately 205 W/(m·K)).

Various examples may include a multi-layer, nested construction cook box (with integrated heat sink design) mounted to the inside of a perforated exterior case (or outer shell), where the multiple layers act as insulating layers to retain and focus the relevant heat (e.g., directly below the cooking surface), therefore maximizing the heat used in the cooking or smoking process, while at the same time preventing excess heat to build up at the exterior and exposed surfaces, making the grill more safe-to-the-touch (e.g., less than about 130°, 135°, 140°, or about 145° in many circumstances, when used as recommended). This multi-layer construction in combination with heatsink design may advantageously provide an efficient and superior heat transfer pathway.

Various embodiments may provide for an improved ventilation system using a slide cover (or plate flap) and associated adjustable dampers (e.g., intake and exhaust). Such a configuration may better regulate the flow of air by allowing for at least three adjustable settings for each of the two cook box shells (250A, 250B) with unique stopping positions (e.g., fully-open, halfway-open, fully-closed). The slide cover may include a series or set of recessed magnets, allowing for a total nine permutations of damper settings, for example. The flap plate may either cap or expose the intake and exhaust ventilation openings with a slide cover or flap moving along a plane of motion, and the plate may be secured to each of the two cook boxes using a static bolt mount (615) housed in a recessed track (270). The settings for the slide cover/flap may be easily accessible and adjustable from the exteriors of both perforated exterior cases or outer shells (e.g., using tab 230).

Various embodiments may provide an improved cooking grate system. In some examples, a cooking grate may be held into place with four corner recessed divots in the perimeter lip of the cook boxes that serve as homes or housings for four corner and corresponding cleat-shaped protrusions in the underside of the cooking grates designed to securely mate inside the designated recessed leave-out areas in the perimeter lip of the cook boxes. In various examples, the cooking grates may be formed of a resilient material (e.g., cast iron, stainless steel, aluminum).

To ensure ideal fitting or mating tightly together to better hold a cooking grate securely in place, various embodiments may incorporate recessed magnets in pocketed leave-outs directly beneath the four corner recessed divots on the underside of both cook boxes. In the depicted exemplary embodiment of FIGS. 5D and 5E, each cook box section 250A, 250B is shown as having four small rectangular cut-outs (occupied by magnets 262) located in the corners of the underside of the lip of each cook box section. These magnets may be (respectively) attracted to the cooking grate components 255A, 255B, to (magnetically) force the cooking grate to stay securely in place (be retained) and not rattle around (e.g., when the case is being opened, when it is being carried around, or on-the-go/in-transit). The magnets may fixedly held in place via a mechanism that may include compression, adhesion, and/or mechanical attachment, for example.

In various examples, a domed or cambered grill grate shape may give the grill grates extra clearance above the flame and firebox. Having a shape with a contoured profile may allow for greater temperature control at the various grate levels, as a user may move items for grilling to and away from the apex or highest level at the center of the dome and thereby level the cooking field because of cooler temperatures near the flanges or edges of the cooking grid. When closing the grill, one of these grill grates or grids may be flipped over (e.g., upside down) to so that they form concentric domes nesting on top of one another when the grill is in the closed position or packed for portability. This egg-like shape may provide greater strength, rigidity, and durability than a typical flat grill grate, while also helping to mitigating weight.

In various embodiments, due to the utilization of heat-sinks included in a grill to disperse excess heat, the exterior of the unit may be cooled through a heat exchange and dissipation process, allowing the exterior to stay safe-to-touch as well as safe to lay flat on an otherwise fragile surface for accessible tabletop grilling. In various examples, notched or ribbed silicone rubber or platinum cure (also known as addition-cure silicone) bumper strips may be composed of "food-safe grade" of silicone. These bumpers/strips, for example, may be a primary and foremost protrusion on the outer surface of the grill (e.g., the first point of contact with a table surface) when laid flat in either the opened or the closed positions. These strips may therefore advantageously serve to add one more layer of protection, insulation, and heat dissipation to the grill, while also giving it a secure, no-slip grip when set directly on any surface.

Various embodiments may provide better reliability, as they may not be too-hot-to-handle and may not cause conditions that produce a contact burn or injury. Various embodiments may provide better reliability because they may be made from die-cast aluminum cook boxes that may be highly durable. Various embodiments may provide ease-of-use and ease-of-cleaning functionality.

Some embodiments may use "green" materials and/or renewable resources as the base material for a carbonized charcoal combustible briquette or puck used to fuel the fire (e.g., coconut shell, bincho-tan, mangrove, hardwood, fruitwood). As such, some examples of the grilling system may be more environmentally friendly. By using a controlled and unified size, shape, volume, and mass for each puck briquette or unit, some embodiments may allow for a controlled, repeatable, and known BTU output for each puck briquette or unit burned. In some examples, combustible materials may burn longer, burn hotter, emit less smoke, and produce less ash, thus making cleanup easier when finished.

Various examples may provide high quality of materials and superior workmanship. Various embodiments may provide a high-end design approach, long product shelf-life, high quality, tightly fitting components, precision assembly, and material and components that do not quickly degrade and deteriorate over time. Thoughtful design, quality construction, and sturdy materials may be evident in various grill components and assemblies. Various exemplary embodiments may be constructed with the following material improvements:

A heavy gauge cast-aluminum material (e.g., A356, A360 or A380 aluminum aircraft alloy) that holds heat better than stainless steel and allows for year-round grilling.

Military specification anodized finish or surface treatment: PER MIL-A-8625F, TYPE II, CLASS 2, BLACK (e.g., non-weathering, no coatings to scratch, chip, delaminate, or otherwise fail).

Aluminum and/or marine grade T304 stainless-steel alloy hardware (e.g., extruded MIL-SPEC continuous or piano hinge, draw-bolt latches).

(Aluminum) cook boxes may be constructed with a tongue and groove nesting lip 252 (see, e.g., outer perimeter physical engagement interface between cook box bottom 250A and cook box top 250B shown in FIG. 7B) for ideal fitting or mating tightly together to hold heat and smoke better and to maximize ash containment and mitigate mess. This tongue and groove feature is shown (in FIG. 7B) as interlocking or nesting mechanical structures, where the peripheral boundary of the bottom and top cook box sections 250A, 250B mate together. In other words, one cook box section (e.g., bottom) may have a male lip feature, and the other cook box section (e.g., top) may have a complementary female lip feature.

Various welds and hardware may be designed to withstand greater pounds of force per square inch.

Cooking grates which are free of carcinogens as well as perfluorinated compounds (PFCs).

Stainless steel or aluminum cooking grates, which may provide for increased material resilience and straightforward manufacturing.

Thermochromic materials used in conjunction with the grill. For example, the outer casing may incorporate a thermochromic material that would indicate when the outer cover is above 140 degrees F. Such materials may be useful in warning people when the grill is too hot to handle. In various examples, the outer casing may be at least partially coated in a thermochromic material. In some embodiments, a thermochromic sticker may be adhesively coupled to an outer surface of the outer casing to provide a visual indication of the outer casing's temperature.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A grilling apparatus comprising:
    an outer casing comprising:
        a bottom casing section;
        a top casing section hingedly coupled to the bottom casing section; and,
        a plurality of convection apertures configured to facilitate fluid communication between an internal cavity of the outer casing and an external ambient environment;
    a heatsink disposed in the internal cavity and enclosed by the outer casing in a closed state, the heatsink comprising:
        a bottom heatsink section fixedly coupled with the bottom casing section; and,
        a top heatsink section fixedly coupled with the top casing section;
    a plurality of attachment members that mechanically support the heat sink in the outer casing, such that a void space is defined in between the outer casing and the heatsink, wherein a thermal conduction pathway between the outer casing and the heatsink is through the plurality of attachment members, and wherein each of the plurality of attachment members comprises a thermally resistive material having a thermal resistance $$R_{th} = \frac{x}{A \cdot k},$$

where x is a length of the thermally resistive material, A is a cross-sectional area of the thermally resistive material, and k is a thermal conductivity of the thermally resistive material; and,
    at least one ventilation flap having a plurality of flap positions to selectively control fluid communication between an internal area of the heatsink and the external ambient environment via at least one heatsink aperture of the heatsink.

2. The grilling apparatus of claim 1, wherein the heatsink further comprises cooling fins disposed on an outer surface of the heatsink.

3. The grilling apparatus of claim 1, wherein in the closed state, the top and bottom heatsink sections engage one another to form a thermal perimeter seal between the top heatsink section and the bottom heatsink section.

4. The grilling apparatus of claim 1, further comprising a bottom grate coupled with the bottom heatsink section.

5. The grilling apparatus of claim 1, further comprising a thermometer probe releasably inserted through a thermometer hole in the outer casing.

6. The grilling apparatus of claim 1, wherein the heatsink has a thermal conductivity of at least 100 W/(m·K).

7. The grilling apparatus of claim 1, further comprising at least one silicone bumper mechanically coupled to the outer casing and configured to support the grilling apparatus and act as a thermal insulator when the grilling apparatus is placed on a surface.

8. The grilling apparatus of claim 1, wherein the plurality of attachment members comprise a plurality of screws.

9. A grilling apparatus comprising:
    an outer casing comprising:
        a bottom casing section;
        a top casing section hingedly coupled to the bottom casing section; and,
        a plurality of convection apertures configured to facilitate fluid communication between an internal cavity of the outer casing and an external ambient environment;
    a heatsink disposed in the internal cavity and enclosed by the outer casing in a closed state, the heatsink comprising:
        a bottom heatsink section fixedly coupled with the bottom casing section; and,
        a top heatsink section fixedly coupled with the top casing section; and, a plurality of attachment members that mechanically support the heat sink in the outer casing, such that a void space is defined in between the outer casing and the heatsink, wherein a thermal conduction pathway between the outer casing and the heatsink is through the plurality of attachment members, and wherein each of the plurality of attachment members comprises a thermally resistive material having a thermal resistance $$R_{th} = \frac{x}{A \cdot k},$$

where x is a length of the thermally resistive material, A is a cross-sectional area of the thermally resistive material, and k is a thermal conductivity of the thermally resistive material.

10. The grilling apparatus of claim 9, wherein the heatsink further comprises cooling fins disposed on an outer surface of the heatsink.

11. The grilling apparatus of claim 9, wherein in the closed state, the top and bottom heatsink sections engage one another to form a thermal perimeter seal between the top heatsink section and the bottom heatsink section.

12. The grilling apparatus of claim 9, further comprising a bottom grate coupled with the bottom heatsink section.

13. The grilling apparatus of claim 9, further comprising a thermometer probe releasably inserted through a thermometer hole in the outer casing.

14. The grilling apparatus of claim 9, wherein the heatsink has a thermal conductivity of at least 100 W/(m·K).

15. The grilling apparatus of claim 9, further comprising at least one silicone bumper mechanically coupled to the outer casing and configured to support the grilling apparatus and act as a thermal insulator when the grilling apparatus is placed on a surface.

16. The grilling apparatus of claim 9, wherein the plurality of attachment members comprise a plurality of screws.

17. A grilling apparatus comprising:
  an outer casing comprising:
    a bottom casing section;
    a top casing section hingedly coupled to the bottom casing section; and,
    a plurality of convection apertures configured to facilitate fluid communication between an internal cavity of the outer casing and an external ambient environment;
  a handle pivotably coupled to the outer casing;
  at least one latch configured to latchingly retain the outer casing in a closed state;
  a heatsink disposed in the internal cavity and enclosed by the outer casing in the closed state, the heatsink comprising:
    a bottom heatsink section fixedly coupled with the bottom casing section; and,
    a top heatsink section fixedly coupled with the top casing section; and,
  a plurality of attachment members that mechanically support the heat sink in the outer casing, such that a void space is defined in between the outer casing and the heatsink, wherein a thermal conduction pathway between the outer casing and the heatsink is through the plurality of attachment members, and wherein each of the plurality of attachment members comprises a thermally resistive material having a thermal resistance $$R_{th} = \frac{x}{A \cdot k},$$

where x is a length of the thermally resistive material, A is a cross-sectional area of the thermally resistive material, and k is a thermal conductivity of the thermally resistive material.

18. The grilling apparatus of claim 17, wherein the heatsink further comprises cooling fins disposed on an outer surface of the heatsink.

19. The grilling apparatus of claim 17, wherein in the closed state, the top and bottom heatsink sections engage one another to form a thermal perimeter seal between the top heatsink section and the bottom heatsink section.

20. The grilling apparatus of claim 17, wherein the plurality of attachment members comprise a plurality of screws.

* * * * *